US 12,462,253 B2

United States Patent
Boyraz et al.

(10) Patent No.: US 12,462,253 B2
(45) Date of Patent: Nov. 4, 2025

(54) ATOMIC PRIVATE TRANSACTION TRANSFERS IN DISTRIBUTED LEDGER

(71) Applicant: Ava Labs, Inc., New York, NY (US)

(72) Inventors: Furkan Boyraz, Istanbul (TR); Emre Kaan Satiş, Istanbul (TR); Mehmet Berat Öztürk, Istanbul (TR)

(73) Assignee: Ava Labs, Inc., New York, NY (US)

( * ) Notice: Subject to any disclaimer, the term of this patent is extended or adjusted under 35 U.S.C. 154(b) by 0 days.

(21) Appl. No.: 18/966,570

(22) Filed: Dec. 3, 2024

(65) Prior Publication Data

US 2025/0182110 A1 Jun. 5, 2025

Related U.S. Application Data

(60) Provisional application No. 63/606,301, filed on Dec. 5, 2023.

(51) Int. Cl.
*G06Q 20/40* (2012.01)
*G06F 9/46* (2006.01)
(Continued)

(52) U.S. Cl.
CPC ....... *G06Q 20/401* (2013.01); *G06F 16/2365* (2019.01); *G06Q 20/3829* (2013.01);
(Continued)

(58) Field of Classification Search
CPC .............. G06Q 20/401; G06Q 20/3829; G06Q 20/389; G06F 16/2365; G06F 9/466; H04L 9/3218
(Continued)

(56) References Cited

U.S. PATENT DOCUMENTS

| | | |
|---|---|---|
| 6,778,666 B1 | 8/2004 | Kuzmich et al. |
| 10,764,029 B1 | 9/2020 | Atkins et al. |

(Continued)

FOREIGN PATENT DOCUMENTS

| | | | | |
|---|---|---|---|---|
| CN | 112819465 A | | 5/2021 | |
| GB | 2623304 A | * | 4/2024 | ........... G06Q 20/401 |
| WO | 2020/142526 A1 | | 7/2020 | |

OTHER PUBLICATIONS

Sheldon, "ACID (atomicity, consistency, isolation, and durability)", retrieved from https://www.techtarget.com/searchdatamanagement/definition/ACID on Feb. 4, 2024, 7 pages (Year: 2024).*

(Continued)

*Primary Examiner* — James D Nigh
(74) *Attorney, Agent, or Firm* — McDermott Will & Schulte LLP

(57) ABSTRACT

Various aspects of the subject technology relate to systems, methods, and machine-readable media for improving the privacy of transfers in a distributed ledger. Various aspects may include creating account state commitments for a transaction including at least an encrypted amount and the account state commitment. Aspects may also include receiving the transaction and storing the account state commitment in a first data structure. Aspects may also include determining an encrypted balance for a receiver based on the encrypted amount included in the transaction. Aspects may also include storing, in a second data structure, the encrypted balance mapped to a public key of the user. Aspects may also include atomically updating an encrypted outgoing balance of the user and a current encrypted balance of the receiver according to the transaction.

18 Claims, 11 Drawing Sheets

(51) Int. Cl.
  *G06F 16/23*  (2019.01)
  *G06Q 20/38*  (2012.01)
  *H04L 9/30*  (2006.01)
  *H04L 9/32*  (2006.01)

(52) U.S. Cl.
  CPC ......... *G06Q 20/389* (2013.01); *H04L 9/3066* (2013.01); *H04L 9/3221* (2013.01); *G06F 9/466* (2013.01); *H04L 9/3218* (2013.01)

(58) Field of Classification Search
  USPC .......................................................... 705/71
  See application file for complete search history.

(56) References Cited

U.S. PATENT DOCUMENTS

| | | |
|---|---|---|
| 11,496,327 B1 | 11/2022 | Kaplan et al. |
| 11,968,304 B2 | 4/2024 | Wright et al. |
| 12,099,997 B1 | 9/2024 | Hoffberg |
| 12,259,996 B2 | 3/2025 | Chiu et al. |
| 2012/0036368 A1 | 2/2012 | Spalka |
| 2012/0087494 A1 | 4/2012 | Spalka et al. |
| 2017/0046698 A1 | 2/2017 | Haldenby et al. |
| 2017/0155515 A1 | 6/2017 | Androulaki et al. |
| 2018/0191503 A1 | 7/2018 | Alwar et al. |
| 2019/0020480 A1 | 1/2019 | Camenisch et al. |
| 2019/0164153 A1 | 5/2019 | Agrawal et al. |
| 2019/0228386 A1 | 7/2019 | Onnainty |
| 2019/0251553 A1 | 8/2019 | Ma et al. |
| 2019/0251554 A1 | 8/2019 | Ma et al. |
| 2019/0251558 A1 | 8/2019 | Liu et al. |
| 2020/0074459 A1 | 3/2020 | Ma et al. |
| 2020/0074552 A1 | 3/2020 | Shier et al. |
| 2020/0193425 A1 | 6/2020 | Ferenczi et al. |
| 2020/0195419 A1 | 6/2020 | Zhang et al. |
| 2020/0311257 A1 | 10/2020 | Wei et al. |
| 2020/0313856 A1 | 10/2020 | Basu et al. |
| 2021/0067321 A1 | 3/2021 | Lu |
| 2021/0150524 A1 | 5/2021 | Yan et al. |
| 2021/0157788 A1 | 5/2021 | Du |
| 2021/0281413 A1 | 9/2021 | Ma et al. |
| 2021/0297262 A1 | 9/2021 | Fang |
| 2021/0297418 A1 | 9/2021 | Fang et al. |
| 2021/0303713 A1 | 9/2021 | Sreedhar et al. |
| 2021/0349770 A1 | 11/2021 | Fang et al. |
| 2021/0350368 A1 | 11/2021 | Young et al. |
| 2021/0374184 A1 | 12/2021 | O'Brien |
| 2021/0382620 A1 | 12/2021 | Fang et al. |
| 2021/0382831 A1 | 12/2021 | Sun et al. |
| 2022/0020018 A1 | 1/2022 | Jivanyan et al. |
| 2022/0092587 A1 | 3/2022 | Jevans |
| 2022/0108310 A1 | 4/2022 | Westland |
| 2022/0164338 A1 | 5/2022 | Blackshear et al. |
| 2022/0255743 A1 | 8/2022 | Vágujhelyi et al. |
| 2022/0263664 A1 | 8/2022 | Wahab et al. |
| 2022/0321360 A1 | 10/2022 | Wahab et al. |
| 2022/0391831 A1 | 12/2022 | Heath et al. |
| 2023/0028324 A1 | 1/2023 | Kikinis et al. |
| 2023/0186296 A1* | 6/2023 | Vines .................. G06Q 20/389 705/71 |
| 2023/0208640 A1 | 6/2023 | El Khiyaoui et al. |
| 2023/0260037 A1 | 8/2023 | Mussallem et al. |
| 2023/0318833 A1 | 10/2023 | Haber et al. |
| 2023/0385265 A1* | 11/2023 | Karamanolis ....... G06F 16/2471 |
| 2024/0007267 A1 | 1/2024 | Kumar et al. |
| 2024/0039715 A1 | 2/2024 | McCarty |
| 2024/0160969 A1 | 5/2024 | Richter |
| 2024/0163075 A1 | 5/2024 | Ku et al. |
| 2024/0171014 A1 | 5/2024 | Rakshit et al. |
| 2024/0185191 A1 | 6/2024 | Bernardi |
| 2024/0187264 A1 | 6/2024 | Wu et al. |
| 2024/0214194 A1 | 6/2024 | Kapur et al. |
| 2024/0283649 A1 | 8/2024 | Richter |
| 2024/0386425 A1 | 11/2024 | De Caro et al. |
| 2024/0422011 A1 | 12/2024 | Sekniqi et al. |

OTHER PUBLICATIONS

Drake, "Accumulators, scalability of UTXO blockchains, and data availability", retrieved from https://ethresear.ch/t/accumulators-scalability-of-utxo-blockchains-and-data-availability/176, Oct. 2017, 12 pages (Year: 2017).*

Watts, "ACID Explained: Atomic, Consistent, Isolated & Durable—BMC Software | Blogs", retrieved from https://www.bmc.com/blogs/acid-atomic-consistent-isolated-durable/, Apr. 24, 2020, 30 pages (Year: 2020).*

Su et al., "Building Blocks for Atomicity in Electronic Commerce", Sixth Usenix Security Symposium Jul. 22-25, 1996, Department of Computer Science, Carnegie Mellon University, 9 pages (Year: 1996).*

Tao et al., On Atomicity and Confidentiality Across Blockchains Under Failures, IEEE Transactions on Knowledge and Data Engineering, vol. 36, No. 2, Feb. 2024, 15 pages (Year: 2024).*

Azeroth: Auditable Zero-Knowledge Transactions in Smart Contracts, IEEE Access, vol. 11, 2023, Jun. 12, 2023, pp. 56463-56480 (Year: 2023).*

• Guan et al. "BlockMaze: An Efficient Privacy Preserving Account-Model Blockchain Based on zk-SNARKs", IEEE Transactions on Dependable and Secure Computing, vol. 19, No. 3, May/Jun. 2022, pp. 1446-1463 (Year: 2022).*

International Search Report and Written Opinion for International Patent App. No. PCT/US2024/058298, mailed Jan. 30, 2025 (16 pages).

International Search Report and Written Opinion for International Patent App. No. PCT/US2024/058300, mailed Feb. 3, 2025 (17 pages).

* cited by examiner

ATOMIC PRIVATE TRANSACTION TRANSFERS IN DISTRIBUTED LEDGER

CROSS-REFERENCE TO RELATED APPLICATIONS

The present disclosure is related and claims priority under 35 U.S.C. § 119 (e), to U.S. Provisional Patent Application No. 63/606,4301, entitled METHOD, SYSTEMS, AND PROTOCOLS FOR ENCRYPTED STORAGE AND TRANSFERS OF USER BALANCES AND AUDITABLE PRIVATE ASSET TRANSFER FRAMEWORK IN A DISTRIBUTED LEDGER, to Furkan Boyraz et al., filed on Dec. 5, 2023, the contents of which are hereby incorporated by reference in their entirety, for all purposes.

TECHNICAL FIELD

The present disclosure generally relates to a privacy-preserving transfer protocol comprising an auditable private asset transfer framework that enables fully atomic, private transactions. The protocol provides auditability for auditors while protecting transaction information from non-auditors. The auditable private transfer is designed using encryption for two recipients (e.g., the recipient and the auditor), enabling auditability of all transactions and leveraging zero-knowledge proofs to maintain privacy requirements.

BACKGROUND

The rapid advancement of blockchain technology highlights the need for enhanced privacy and security measures for digital assets. Public blockchains inherently expose user activities, which conflicts with privacy regulations (e.g., EU General Data Protection Regulation (GDPR)). Private blockchains also require robust privacy solutions beyond basic network-level restrictions to ensure regulatory compliance and support distributed institutional ledgers. Existing protocols present significant limitations that lead to a suboptimal user experience and are impractical for real-world applications. Additionally, privacy-centric protocols often face challenges in maintaining transaction validity and transparency, complicating compliance with anti-money laundering (AML) regulations and auditability requirements. Further, unlike traditional banking systems, the blockchain creates privacy concerns about digital assets since all transaction information is shared across the network to ensure strong data integrity. This transparency, while beneficial for security, poses privacy risks for users and their transactions.

Addressing these privacy concerns is crucial for the continued growth and acceptance of blockchain technology in various sectors. Therefore, there is a pressing need for solutions that can provide robust privacy measures without compromising the core principles of blockchain technology.

BRIEF SUMMARY

The subject disclosure provides for systems and methods for providing atomic private transactions through a protocol that implements a decoupled account state model.

According to embodiments, a computer-implemented method for implementing secure transfers in a distributed ledger is provided. The method includes receiving a transaction from a user, the transaction including at least an encrypted amount and an account state commitment. The method also includes storing the account state commitment in a first data structure. The method also includes determining an encrypted balance for a receiver based on the encrypted amount. The method also includes storing, in a second data structure, the encrypted balance mapped to a public key of the user. The method also includes atomically updating an encrypted outgoing balance of the user and a current encrypted balance of the receiver according to the transaction.

According to embodiments, a system is provided including a processor and a memory comprising instructions stored thereon, which when executed by the processor, cause the processor to perform operations to improve security of transfers in a distributed ledger. The operations include receiving a transaction from a user, the transaction including at least an encrypted amount and an account state commitment. The operations also include storing the account state commitment in a first data structure. The operations also include determining an encrypted balance for a receiver based on the encrypted amount. The operations also include storing, in a second data structure, the encrypted balance mapped to a public key of the user. The operations also include atomically updating an encrypted outgoing balance of the user and a current encrypted balance of the receiver according to the transaction.

According to embodiments, a non-transitory computer-readable medium stores a program for implementing secure transfers in a distributed ledger, which when executed by a computer, configures the computer to receive a transaction from a user, the transaction including at least an encrypted amount and an account state commitment. The program, when executed by a computer, further configures the computer to store the account state commitment in a first data structure, wherein the first data structure corresponds to an outgoing Merkle tree tracking a state of an outgoing balance and the account state commitment is stored as a leaf in the outgoing Merkle tree. The program, when executed by a computer, further configures the computer to determine an encrypted balance for a receiver based on the encrypted amount. The program, when executed by a computer, further configures the computer to store, in a second data structure, the encrypted balance mapped to a public key of the user, wherein the second data structure corresponds to an incoming Merkle tree tracking a state of an incoming balance and a hash of the encrypted balance is stored as a leaf in the incoming Merkle tree. The program, when executed by a computer, further configures the computer to atomically update an encrypted outgoing balance of the user and a current encrypted balance of the receiver according to the transaction.

These and other embodiments will become clear to one of ordinary skill in the art, in view of the following.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

Figure 1:
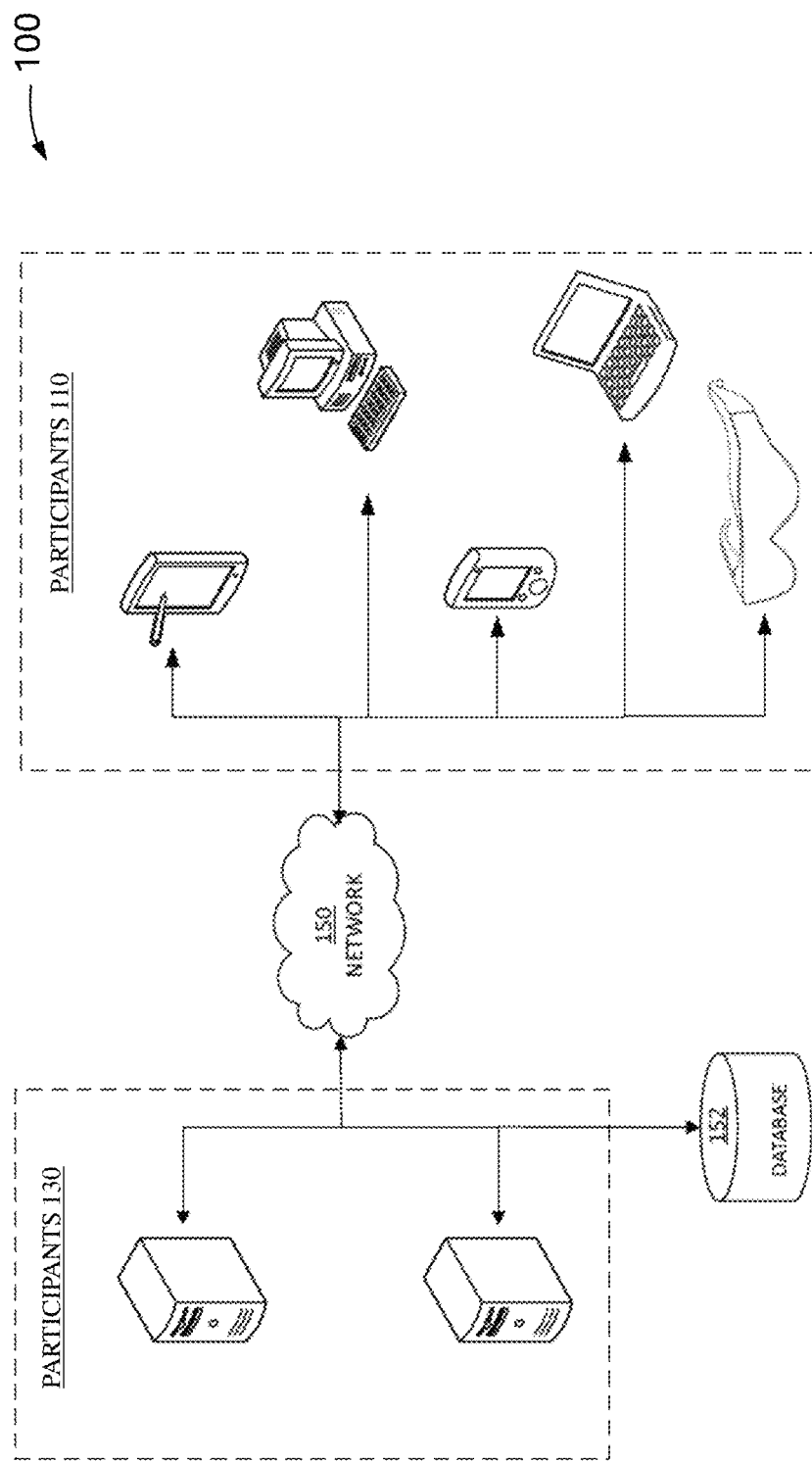
FIG. 1 is a block diagram of a device operating environment with which aspects of the present disclosure can be implemented.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

The detailed description set forth below describes various configurations of the subject technology and is not intended to represent the only configurations in which the subject technology may be practiced. The detailed description includes specific details for the purpose of providing a thorough understanding of the subject technology. Accordingly, dimensions may be provided in regard to certain aspects as non-limiting examples. However, it will be apparent to those skilled in the art that the subject technology may be practiced without these specific details. In some instances, well-known structures and components are shown in block diagram form in order to avoid obscuring the concepts of the subject technology.

General Overview

Blockchain technology has surged in popularity, highlighting the need for enhanced privacy and security measures for digital assets. The necessity for privacy in public blockchains is evident due to their inherent transparency. Public blockchains inherently expose user activities, which conflicts with privacy regulations (e.g., EU General Data Protection Regulation (GDPR)). Private blockchains also require robust privacy solutions beyond basic network-level restrictions to ensure regulatory compliance and support distributed institutional ledgers. While private blockchains seem suitable for institutional use by avoiding single points of failure, they have a major flaw: they do not prevent data leakage. Unlike centralized systems with separate, encrypted backups, private ledgers are vulnerable if network-level privacy is breached, as all nodes replicate the same data. This increases the attack surface and potential points of failure.

Current protocols present significant limitations including, for example, offering high anonymity through accumulators, resulting in impractical non-atomic transactions that rely on guesswork, or providing limited confidentiality, which is only suitable for small values or demands high computational resources. These limitations lead to a suboptimal user experience and are impractical for real-world applications. Additionally, privacy-centric protocols often face challenges in maintaining transaction validity and transparency, complicating compliance with anti-money laundering (AML) regulations and auditability requirements. Further, unlike traditional banking systems, the blockchain creates privacy concerns about digital assets since all transaction information is shared across the network to ensure strong data integrity. This transparency, while beneficial for security, poses privacy risks for users and their transactions.

Various studies have been attempted to protect transaction privacy by utilizing cryptographic techniques (e.g., mixers, ring signatures, homomorphic encryption, zero-knowledge proofs, etc.). The zero-knowledge proof (ZKP) system is a widely used solution to resolve the conflict between privacy and verifiability. The ZKP system can prove the validity of the statement without revealing the witness value; users can prove arbitrary statements of encrypted data, enabling public validation while protecting data privacy. As asset transactions on the blockchain increase, the demand for adequate auditing capabilities is also increasing. Moreover, if transaction privacy is protected without proper regulation, financial transactions can be abused by bad actors. Without the management of illegal money flows, it would also be difficult to establish a monetary system required to maintain a sound financial system and enforce policies accordingly.

Accordingly, there is a need for an auditability strategy that effectively deters illicit users without compromising decentralization. Unlike centralized systems, a decentralized blockchain protocol benefits from an automated setup that does not require constant active participation, thereby enhancing security and streamlining operations. Furthermore, the integration of an auditability feature is crucial, particularly in protocols that offer anonymity by concealing user identities. This feature ensures that while user privacy is maintained, the system remains transparent and compliant with regulatory standards. Conversely, when a protocol focuses solely on confidentiality-hiding transactional values such as balances and amounts—the necessity for auditability diminishes. This nuanced understanding aids in the design of a blockchain protocol that is both secure and privacy-respecting, aligning with the core principles of blockchain technology.

In blockchain-based privacy, "confidentiality" refers to hiding numerical values (e.g., balances and amounts) rather than identities or transaction functions. Most blockchain operations, especially in permissioned institutional networks, require confidentiality rather than anonymity, as institutions already know their users but need to prevent other entities from seeing user details. Therefore, confidentiality-based schemes are limited by inefficient decryption methods or commitment schemes that hinder user experience and institutional adoption.

In some embodiments, accumulators are used to gather data into a set and generate proofs about the state of the data. Accumulators may require extensive computation and are difficult to construct in zero-knowledge proofs. Some accumulators also need a trusted setup, posing a single point of failure risk. A significant issue with accumulators is the need for constant monitoring to keep balances current. Users must scan the accumulator to identify their holdings, making these protocols impractical for fast blockchains with high transaction rates. This results in poor user experience and increased blockchain state growth due to additional transaction fields.

As it becomes apparent, non-atomicity is an inherent characteristic in accumulator-based systems. This is due to the way transactions are conducted: the sender does not directly transfer notes to the recipient. Instead, they deposit them into the accumulator, a collective pool, in a manner that only the intended recipient can identify at a later stage. The recipient must then attempt to decrypt each encrypted note in the pool one by one, in a brute-force fashion, to detect his notes. Following this, they calculate the nullifier for the note to verify whether it has already been spent, as all notes in the pool appear identical to every participant. While this mechanism ensures anonymity for both sender and receiver, the lack of atomicity significantly hampers the user experience.

Merkle trees are the most common type in privacy protocols due to their fast membership proof generation without revealing the data. These protocols, often called UTXO-based protocols, create a common pool for transactional values rather than direct transfers between accounts. Users own data (referred to as "notes") in a Merkle tree and use nullifiers (serial numbers) to spend these notes, ensuring privacy. Users must actively track their notes and nullifiers to maintain their balance. On-chain mixers use public notes, requiring all notes to have the same value to prevent traceability, thus providing anonymity but not confidentiality.

Group-based protocols (also referred to as "K-anonymity protocols") use group or ring signatures to hide transaction identities within a smaller subset of protocol members. These protocols can be implemented as entire blockchain protocols or as smart contracts within account-based blockchains. However, the anonymity is limited to a fixed number of participants and the sender must include random members' public keys in the transaction. This can lead to less secure financial privacy and more computational overhead.

Overall, existing schemes and models fall short in providing adequate privacy without compromising user experience, practicality, and expressiveness.

Embodiments, as disclosed herein, provide a solution to the above-mentioned problems rooted in computer technology, namely, a transfer protocol designed using a pioneering privacy-preserving framework that provides auditability for auditors while protecting transaction information from non-auditors. According to embodiments, the transfer protocol is designed to be versatile, capable of integration within account-based blockchains. In some implementations, the transfer protocol may operate as a smart contract running on a blockchain. In some implementations, the transfer protocol may support multiple tokens in a single protocol. In some embodiments, the transfer protocol may be established as an independent blockchain for enhanced flexibility. The transfer protocol achieves atomic private transactions through a novel hybrid account model named Decoupled Account State (DAS), ingeniously merging the anonymity of the UTXO model with the atomic nature of the account-based model. To provide the improved, practical privacy layer for the blockchains, the transfer protocol is designed to meet specific requirements, including: atomic transactions; prioritizing speed and efficiency while simultaneously ensuring anonymity and confidentiality; auditability with inactive auditors; and suitable function for both permissionless public and permissioned private blockchain ledgers.

According to some embodiments, the auditable private asset transfer framework of the transfer protocol implements encryption techniques and zk-proofs to provides practical privacy, verifiability, and auditability for personal digital assets while maintaining the efficiency of transactions. The transfer protocol preserves the functionality of blockchains while providing the additional zero-knowledge feature to meet privacy requirements.

According to embodiments, the transfer protocol includes an auditability feature with inactive auditors. According to some embodiments, the transfer protocol is devised using encryption for two recipients (e.g., a recipient and an auditor) enabling an auditability feature with inactive auditors. For example, a sender encrypts a transaction so that only its receiver and an auditor can decrypt it. At the same time, the sender proves that the ciphertext satisfies all the requirements for validity of the transaction. According to embodiments, zk-SNARK (Zero-Knowledge Succinct Non-Interactive Argument of Knowledge) proofs are used to prove arbitrary functionalities for messages, including encryption. This provides an auditor with the ability to audit all transactions while still limiting the auditor's capability to auditing, preserving the privacy of the transactions. According to embodiments, the auditor cannot manipulate any transactions for the standard configuration.

According to embodiments, the transfer protocol enables fully atomic, private transactions. Once a transaction is initiated by the sender, the receiver's balance (atomically) increases without the receiver conducting any complex or time-intensive operations (e.g., searching through an accumulator). This implies that receivers should always have instant knowledge of their note locations or total balance, akin to an account-based blockchain system. Additionally, the location of their balance should remain unchanged unless they explicitly consent to any alterations, which would otherwise necessitate active searching. According to embodiments, to alleviate the burden on the receiver of locating their notes to ascertain their most recent balance, the transfer protocol is designed to automatically update the receiver's balance within the transfer function executed by the sender.

Facilitating atomic transactions while preserving identity anonymity in distributed systems is a complex challenge, primarily due to their deterministic framework. Smart contracts or app-specific blockchains serve as decentralized intermediaries, executing tasks according to preset rules. To modify states accurately, these intermediaries require a certain degree of information. Minimizing this data exposure is where zero-knowledge proofs, especially when combined with hash-based accumulators, become valuable. For instance, a user can verify the presence of a value in a Merkle tree to a smart contract by providing only the tree's root, along with a proof validating the correct generation of the Merkle proof.

According to some embodiments, the transfer protocol employs the DAS model for identity privacy. The DAS model allows for private yet auditable transactions on any blockchain, with provisions for authorized auditors to inspect the transactions. The DAS model ensures that users are always aware of the current state of their accounts, including the most recent balance. It operates on the principle that a user, equipped solely with their private key, can deterministically ascertain the state of their account. This eliminates the need for brute force or guesswork, while simultaneously enabling the execution of anonymous and confidential transactions.

According to embodiments, the DAS model in the transfer protocol mandates that only the person holding the private key to an account has the power to authorize transactions that reduce the account's balance. This means that the account owner is the sole authority for spending funds from their account, and this can only occur with their explicit permission. On the other hand, anyone who knows the account identifier has the capability to increase the account's balance, and this can be done without the need for consent or any intervention from the account owner or intermediaries.

The balance of an account at any given time t is the aggregate of all inbound and outbound transactions (positive and negative changes) up to that time t (i.e., $\text{Balance}_t = \Sigma(\text{Incoming}) - \Sigma(\text{Outgoing})$). According to embodiments, since only the account owner has the authority to decrease their balance and anyone can add to it, the DAS model bifurcates the balance into two distinct components: the incoming balance and the outgoing balance, where each of these is calculated and maintained as separate data structures. Transactions that reduce the user's balance contribute to an outgoing sum and transactions that increase the balance contribute to the incoming sum.

According to embodiments, the incoming balance is stored as an encrypted balance mapped to the user's public key. The encryption method for this balance requires efficient additively homomorphic encryption which can be obtained according to a zk-proof (e.g., confidentiality-preserving token (CPT) protocol leveraging zk-morphic proofs and additively homomorphic Elliptic Curve ElGamal (ECEG) encryption over the Baby Jubjub curve). The zk-proof, additively homomorphic encryption mechanisms are further described in U.S. patent application Ser. No. 18/966,562, which is incorporated herein by reference in its entirety.

According to embodiments, a hash of the encrypted incoming balance may be stored in an incoming Merkle tree (IMT). The IMT may be a Merkle tree that both supports insertion and update on leaves. This is crucial for users to prove their ownership of balances without leaking their identities (public keys), while preserving the atomicity. The outgoing balance may be stored within a commitment (hereafter referred to as "account state commitment (ASC)") in an outgoing Merkle tree (OMT). By separating the IMT and the OMT, the transfer protocol may achieve the desired levels of privacy and atomicity in a system.

Embodiments describe the transfer protocols application within a decentralized computing environment but are not limited to this. According to some embodiments, the transfer protocol may be configured for more permissioned use cases (e.g., Central Bank Digital Currencies (CBDCs)). In some implementations, the transfer protocol is designed as a smart contract, making it flexible for deployment and adaptable for specific applications. The transfer protocol may include protocol-level optimizations that further enhance performance and security in different blockchain environments.

The transfer protocol's practicality may be demonstrated through implementation tests on mobile devices. By non-limiting example, decryption of client balances is achieved in under 0.3 seconds, and generating the proof for private transfer may take about 0.4 seconds, showcasing the framework's efficiency and real-world applicability.

According to some embodiments, the privacy-focused and auditable nature of the transfer protocol makes it ideal for processing secure and efficient on-chain payments.

According to some embodiments, the transfer protocol may be implemented in a point-of-sale (POS) terminal application which can operate without any centralized assistance, suitable for a wide range of payment needs, including in-store purchases. The transfer protocol's ability to conduct atomic transactions simplifies the process for POS terminals by eliminating the need for complex operations like creating nullifiers or scanning accumulators for incoming funds. This simplification results in lower operational costs and marks a significant step forward in the field of payment systems, enabling more secure and efficient transactions.

According to some embodiments, the transfer protocol's privacy benefits may extend to the tokenization of real-world assets (RWA), addressing a critical gap in the blockchain ecosystem. Traditional tokenization efforts often face challenges related to the accurate representation of physical assets on a digital platform, as well as ensuring the security and privacy of these transactions. The transfer protocol's design allows for the seamless conversion of real-world assets into digital tokens, while maintaining a high degree of privacy and auditability. By utilizing the atomic-privacy framework, assets (e.g., property, commodities, fine art, etc.) can be tokenized, ensuring that ownership rights are preserved and protected in a digital ledger. This opens up the potential for a broad range of users, from individuals to large institutions, to securely tokenize and manage their real-world assets on the blockchain, unlocking new possibilities for investment, trading, and asset management.

According to some embodiments, the transfer protocol is uniquely positioned to accommodate the specific requirements of central banks. In some implementations, the transfer protocol may grant central banks full control over user accounts, enable pre-transaction validation, and allow the minting of natively encrypted tokens, among other capabilities. These features equip central banks with the necessary tools to oversee and regulate the digital currency in accordance with their monetary policies and regulatory standards. In this manner, the versatile architecture of the transfer protocol facilitates the implementation of CBDCs in both public permissionless and private permissioned blockchain settings without compromising on security. This flexibility ensures that central banks can leverage the robustness of blockchain technology while maintaining the sovereignty and privacy of their digital currency operations.

According to some embodiments, the integration of the OMT in the transfer protocol allows for the execution of anonymous calls to other smart contracts on a ledger. This capability empowers users to interact with a range of decentralized finance (DeFi) protocols, enabling operations like swaps, lending, and various contract interactions. Through the transfer protocol, while users can conduct these operations anonymously, their actions remain auditable for compliance purposes for a balance between privacy and transparency.

As used herein, the term "blockchain" generally refers to an open and distributed public ledger comprising a growing list of records, which are linked using cryptography. By design, the blockchain is resistant to modification of the data. The blockchain can include an auditable database that provides a distributed, replicated ledger of cryptographically certified artifacts whose contents are extremely difficult to tamper with without detection, and therefore, are with very high probability, true copies of the intended content, and whose content are open for inspection via a suitable query interface.

As used herein, the term "block" generally refers to a record that is kept in a blockchain. For example, each block contains a cryptographic hash of the previous block, a timestamp, and transaction data, which can generally be represented as a Merkle tree root hash.

In some embodiments, the term "subnet" or "subnetwork" generally refers to a dynamic set of validators working together to achieve consensus on a state of a set of blockchains. For example, each blockchain is validated by exactly one subnet. A subnet can validate arbitrarily many blockchains. A validator node may be a member of arbitrarily many subnets. A subnet may manage its own membership and it may require that its constituent validators have certain properties. Herein, the term "subnet" may generally refer to one or more subnets and/or subnetworks.

In some embodiments, a customized blockchain may include a VM marketplace having subnets serviced by unique VM modules that allow users to create feature sets directed to specific needs. For example, a gaming application in the VM marketplace will have different VM modules than a finance application.

Example System Architecture

FIG. 1 illustrates a network architecture 100 used to implement a blockchain framework for practical and compliant on-chain privacy. Specifically, in this example, the network architecture 100 provides a blockchain implementation of an atomic private transfer system, according to some embodiments.

In the example of FIG. 1, the network architecture 100 includes one or more participants 110 and one or more participants 130 which are communicatively coupled through a network 150. The network 150 may include a wired network (e.g., via fiber optic or copper wire, telephone lines, and the like) and/or a wireless network (e.g., a satellite network, a cellular network, radiofrequency (RF) network, Wi-Fi, Bluetooth, and the like).

The network 150 may further include one or more of a local area network (LAN), a wide area network (WAN), the Internet, and the like. Further, the network 150 may include, but is not limited to, any one or more of the following network topologies, including a bus network, a star network, a ring network, a mesh network, and the like.

The participants 110 may include any one of a laptop computer, a desktop computer, or a mobile device such as a smart phone, a palm device, a tablet device, a television, a wearable device, a display device, or other device with sufficient computational, storage, and communication resources to execute software implementing various aspects of embodiments and that can be stored in a memory of the device. The participants 110 may be clients of the blockchain framework for creating, expanding, or otherwise modifying customized blockchain networks and/or private or public subnets. The participants 110 may comprise a plurality of nodes for a blockchain network. A node for a blockchain network may comprise an application or other software that records and/or monitors peer connections to other nodes and/or miners for the blockchain network. The nodes may continually record the state of the blockchain and respond to remote procedure requests for information about the blockchain. Aspects of a transfer protocol may be implemented at the node level, as part of a blockchain client software.

In some embodiments, the participants 130 may be a cloud server or a group of cloud servers. In other embodiments, some or all of the participants 130 may not be cloud-based servers (i.e., may be implemented outside of a cloud computing environment, including but not limited to an on-premises environment), or may be partially cloud-based. Some or all of the participants 130 may be a computing device such as part of a cloud computing server including one or more desktop computers or panels mounted on racks, and/or the like. The panels may include processing boards and also switchboards, routers, and other network devices. In some embodiments, the participants 130 may include the participants 110 as well, such that they are peers.

The participants 110 and/or the participants 130 may function as nodes for one or more blockchains implemented on the network architecture 100. As an example, the participants 110 and/or the participants 130 may themselves be, or may execute, virtual machines (VMs) that function as nodes of one or more blockchains, and accordingly run software to verify block and transaction data, store data, validate, respond to network requests for data, execute smart contracts, and/or the like for their respective blockchain(s). The VMs may be computers that run on blockchains and allow smart contracts from multiple sources to interact with one another.

As a non-limiting example, multiple participants 110 may have access to at least one blockchain network hosted by the participants 130. As another non-limiting example, the participants 130 may provide services such as Internet based services including web2 services and web3 services, for example, to the participants 110.

The participants 130 may store blockchain data in a peer-to-peer (P2P) and/or distributed ledger fashion in a database 152. Database 152 may be a single database or a distributed database. The database 152 may store relevant information including, but not limited to, a shared registry, execution and verification logic, and/or rules for implementing consensus and messaging protocols.

The participants 130 may be configured to concurrently implement multiple blockchains of different types, including but not limited to an asset blockchain (e.g., for creating new assets, asset exchange, cross-subnet transfers), a metadata blockchain (e.g., for coordinating validators, tracking active subnets, and creating new subnets), and a smart contract blockchain (e.g., for creating smart contracts and applications that require total ordering).

Figure 2:
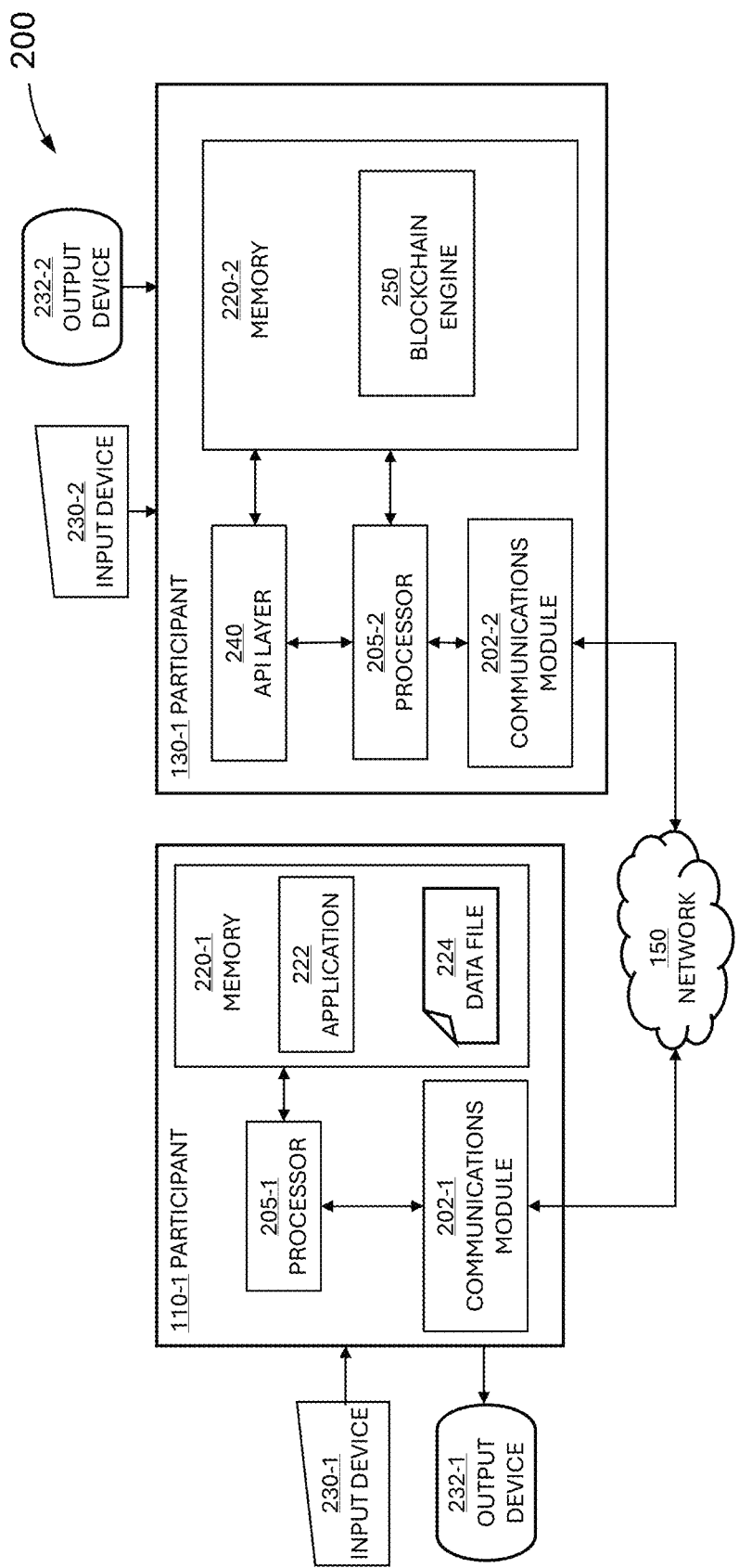
FIG. 2 is a block diagram illustrating details of devices used in the architecture of FIG. 1, according to certain aspects of the present disclosure.

FIG. 2 is a block diagram illustrating details of devices used in the architecture of FIG. 1, according to some embodiments. Specifically, the example of FIG. 2 illustrates an exemplary participant 110-1 (of the participants 110) and an exemplary participant 130-1 (of the participants 130) of the network architecture 100 of FIG. 1. The system 200 may implement protocols for blockchain-related consensus or messaging for any subnet or blockchain executing on the network architecture 100.

The participant 110-1 and the participant 130-1 access each other and other devices in the network 150 via corresponding communications modules 202-1 and 202-2, respectively. For example, participant 110-1 and the participant 130-1 may be connected by wired or wireless means to the Internet and support communication with a blockchain distributed ledger with smart contract support, such as Ethereum, via communications modules 202-1 and 202-2. Other embodiments may use different blockchains, or non-blockchain based embodiments may also have utility in some circumstances.

The communications modules 202-1 and 202-2 can be, for example, modems or Ethernet cards, and may include radio hardware and software for wireless communications (e.g., via electromagnetic radiation, such as radiofrequency (RF), near field communications (NFC), Wi-Fi, and Bluetooth radio technology). The participant 110-1 and participant 130-1 also include a processor 205-1, 205-2 and memory 220-1, 220-2, respectively. Communications modules 202-1 and 202-2, processors 205-1 and 205-2, and memories 220-1 and 220-2 will be collectively referred to, hereinafter, as "communications modules 202," "processors 205," and "memories 220." Processors 205 may be configured to execute instructions stored in memories 220, to cause participant 110-1 and/or participant 130-1 to perform methods and operations consistent with embodiments of the present disclosure.

The participant 110-1 and the participant 130-1 are coupled to at least one input device 230-1 and input device 230-2, respectively (hereinafter, collectively referred to as "input devices 230"). The input devices 230 can include a mouse, a keyboard, a pointer, a stylus, a touchscreen, a microphone, voice recognition software, a joystick, a virtual joystick, a touch-screen display, and the like. The participant 110-1 and the participant 130-1 are also coupled to at least one output device 232-1 and output device 232-2, respectively (hereinafter, collectively referred to as "output devices 232"). The output devices 232 may include a display (e.g., a same touchscreen display used as an input device), a speaker, an alarm, and the like. A user may interact with participant 110-1 and/or participant 130-1 via the input devices 230 and the output devices 232.

The participant 110-1 can implement and/or manage the blockchain framework described herein by executing application 222 executing within memory 220-1 and couple with input devices 230 and output devices 232. The application 222 may be downloaded by a user from participant 130-1, and/or may be hosted by participant 130-1. The application 222 includes specific instructions which, when executed by processor 205-1, perform operations consistent with embodiments of the present disclosure.

In some embodiments, the application 222 runs on an operating system (OS) installed on participant 110-1. In some embodiments, application 222 may run within a web browser, wallet, finance application, or the like. In some embodiments, the processor 205-1 is configured to control a graphical user interface (GUI) (spanning at least a portion of input devices 230 and output devices 232) for the user of participant 110-1 to access participant 130-1. According to some embodiments, application 222 may include encryption and decryption schemes which can be downloaded and installed in participant 110-1. Various aspects of the encryption and decryption schemes may be implemented in software executed by the user devices. By non-limiting example, the software may make use of existing smart wallet functionality available on participant 110-1. Other functionality may be implemented remotely, such as, for example, in the context of smart contracts executed by devices supporting the blockchain transaction ledger.

Data and files associated with the application 222 may be stored in a local data file 224 stored in memory 220-1, a local database of participant 110-1 or participant 130-1, or an external database (e.g., database 152, a distributed database, and the like). The participant 110-1 may be used by a user of the blockchain framework to perform blockchain functions including, but not limited to, message transfer, exchange transactions, blockchain validation, smart contract registration, block proposal, and the like.

Participant 130-1 includes an API layer 240, which may control the application 222 in participant 110-1. API layer 240 may also provide instructions, procedural information, updates, or the like to participant 110-1 as, e.g., new features are uploaded in the application 222.

In some embodiments, memory 220-2 includes a blockchain engine 250. The blockchain engine 250 may be configured to perform methods and operations consistent with embodiments of the present disclosure. The blockchain engine 250 may share or provide features and resources with a client device, including data, libraries, and/or applications retrieved with blockchain engine 250 (e.g., application 222). The user may access the blockchain engine 250 through the application 222. Application 222 may be installed in participant 110-1 by participant 130-1 and perform scripts and other routines provided by participant 130-1.

According to embodiments, the blockchain engine 250 may include, but is not limited to, an encryption component configured to implement an encryption mechanism, a proofing component configured for generating and/or verifying zk-proofs, etc.

System Framework

Figure 3:
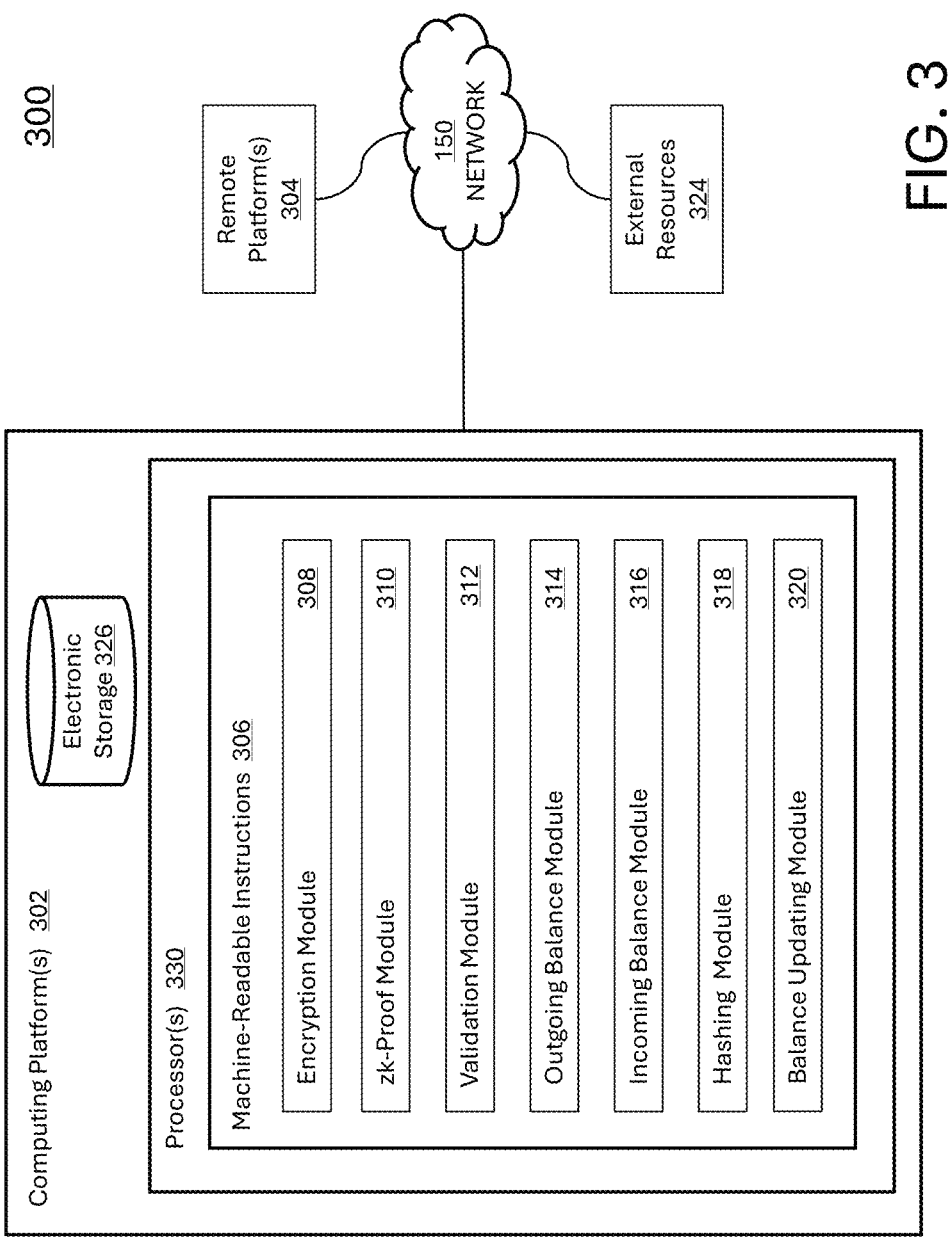
FIG. 3 is a block diagram illustrating an atomic-private transfer (APT) system implementing aspects of the subject technology, according to certain aspects of the present disclosure.

FIG. 3 is a block diagram illustrating an atomic-private transfer (APT) system 300 implementing aspects of the subject technology, according to one or more embodiments. According to some embodiments, APT system 300 may be implemented as a standalone blockchain. According to some embodiments, APT system 300 may be implemented as a series of smart contracts within Virtual Machine (VM) compatible blockchains. By non-limiting example, the APT system 300 may be implemented within a blockchain network running atomic-private transfer smart contracts. According to embodiments, the smart contract may be deployed on a blockchain or in a blockchain network that includes one or more blockchains or subnets. Users may interact with the smart contract through web browsers by connecting their digital wallets to decentralized applications (dApps). These dApps may provide a user interface that allows users to deploy and interact with the smart contract.

In some implementations, the APT system 300 may include one or more computing platforms 302 executing various aspects of the system. The computing platform(s) 302 can correspond to a server component of the blockchain platform, which can be similar to or the same as the computing device(s) of participants 130 of FIG. 1 and include the client computing device(s) of participants 110 of FIG. 1 and include the processors 205 in FIG. 2.

Computing platform(s) 302 may represent blockchain platforms, nodes, validators, minor computers, or the like. The computing platform(s) 302 may be configured to communicate with one or more remote platforms 304 according to a client/server architecture, a peer-to-peer architecture, and/or other architectures. The remote platform(s) 304 may be configured to communicate with other remote platforms via computing platform(s) 302 and/or according to a client/server architecture, a peer-to-peer architecture, and/or other architectures. The remote platform(s) 304 can be configured to cause output of the system 300 on client device(s) of the remote platform(s) 304 with enabled access (e.g., based on analysis by the computing platform(s) 302) according to stored data. Any external blockchain platform built based on a platform/metadata chain of the computing platform(s) 302 that relies on the primary blockchain may also realize the benefits of the transfer protocols, according to embodiments. In this way, the platform chain, primary network, and other entities of the blockchain platform may communicate with the computing platform(s) 302. The computing platform(s) 302, external resources 324, and remote platform(s) 304 may be in communication and/or mutually accessible via the network 150.

The computing platform(s) 302 may be configured by machine-readable instructions 306. The machine-readable instructions 306 may be executed by the computing platform(s) to implement one or more instruction modules. The instruction modules may include computer program modules. The instruction modules being implemented may include one or more of an encryption module 308, zk-Proof module 310, validation module 312, outgoing balance module 314, incoming balance module 316, hashing module 318, and balance updating module 320.

The encryption module 308 may be configured to encrypt an incoming balance. The incoming balance may include incoming amounts, identities of the participants in transfers, and account balances. The encryption module 308 may employ an encryption scheme including, for example, setup, encryption, and decryption operations for the confidential transfer, encrypted storage of user balances and user identities. According to embodiments, the encryption module 308 may be configured to encrypt values included in an account state commitment (ASC) generating for new trans-actions/operations.

According to some embodiments, the encryption module 308 may employ an additively homomorphic encryption scheme capable of supporting addition over encrypted data. In some embodiments, the encryption module 308 employs an Elliptic Curve Diffie-Hellman (ECDH) protocol, providing a secure method for two parties to generate a shared secret over an unsecured channel. ECDH relies on the difficulty of solving the Elliptic Curve Discrete Logarithm Problem (ECDLP) and involves three main steps: key generation, key exchange, and shared secret utilization. During key generation, a security parameter is used to select an elliptic curve and a base point, from which a private key is chosen randomly and a corresponding public key is computed. In the key exchange phase, each party uses the other's public key and their own private key to compute a shared secret through scalar multiplication. Finally, the shared secret is used to derive a symmetric key via a key derivation function, which is then employed for encrypting and decrypting messages. ECDH's efficiency and robust security may be used to ensure secure key exchanges for encrypted communications within the atomic-private transfer smart contracts.

According to some embodiments, the ECDH encryption may be implemented over an elliptical curve. According to embodiments, the smart contract may utilize ECDH over Baby Jubjub elliptic curves. The Baby Jubjub elliptic curve is an exemplary twisted Edwards curve optimized for high security and efficiency in zero-knowledge proofs, such as the zk-SNARKs. The Baby Jubjub curve is defined over a prime field $F_p$ with non-zero elements. The Baby Jubjub curve is particularly suited for zk-SNARKs due to its efficient arithmetic operations, which help create smaller and more efficient proof sizes. Using the Baby Jubjub curve in ECDH enables SNARK-friendly homomorphic addition and subtraction, significantly reducing proof generation times. According to embodiments, the encryption module 308 may implement a sub-value method including a decryption process which leverages the Chinese Remainder Theorem (CRT) to retrieve a final decrypted value.

According to embodiments, the encryption module 308 may implement an asymmetric, public-key encryption scheme, denoted as PE=(Gen, Enc, Dec), consisting of key generation algorithm Gen ($1^\lambda$) for creating a key private-public pair (sk, pk) based on a security parameter ($1^\lambda$), an encryption algorithm Encpk (msg) which uses the public key (pk) and an integer message (msg) to produce a ciphertext (ct), and a decryption algorithm Decsk (ct) which employs the private key (sk) and the ciphertext (ct) to retrieve the original message (msg). In some embodiments, the APT system 300 employs Elliptic Curve ElGamal (ECEG) key generation which involves selecting a private key (d) and deriving the public key (Q=dG). The encryption module 308 maps a scalar message (m) to a point (M) on the elliptic curve, then computes the ciphertext pair (C1, C2). The encrypted message may be decrypted using the private key (d) to retrieve the original message (M). The security of ECEG relies on the ECDLP and ensures semantic security under the decisional Diffie-Hellman assumption. Despite challenges in mapping arbitrary scalar messages to EC points, this method maintains robust security and supports efficient homomorphic operations for confidential transfers and encrypted storage of user balances.

The zk-Proof module 310 may generate a zk-proof to prove the correctness of the encryption. According to embodiments, the zk-proof may be a zk-SNARK proof, a cryptographic proofing system that allows a prover to demonstrate the validity of a computation to a verifier without disclosing the input values. The prover can only convince the verifier of the truth of the statement if that statement itself is actually true. The verifier does not know any knowledge (zero knowledge) of the prover's statement or solution, other than the truth of the statement. According to embodiments, the zk-proofs may be zk-morphic proofs which refer to the proving method for utilization of algorithms within a zk-SNARK circuit. The zk-morphic proofs enable efficient proving values in the ASC and reconstruction of it, and ownership of an account or balance.

According to embodiments, the zk-proof may also include an encrypted transaction summary or summary field for an auditor. The summary field is designed to facilitate transaction audits by, for example, protocol deployers. According to some embodiments, the summary is the symmetric encrypted version of the transaction amount of the confidential transfer, secured using an auditor key. In some embodiments, zk-proofs employ Poseidon symmetric encryption in conjunction with ECDH to encrypt the transaction summary using the auditor's public key. The resulting ciphertext is then emitted by the APT smart contract. This ensures that transaction data is accessible only to the designated auditor. Further, the improved auditability not only enables rapid transaction verification but also preserves the decentralized ethos of the APT framework, as it does not hinge on the auditor's transaction-by-transaction approval. This ensures that the auditor need not be perpetually online, thereby conserving computational resources and time.

According to embodiments, the APT system 300 may be further configured to package the transaction data in a payload and publish the transaction to a blockchain. The payload may include encrypted transfer amounts, the zk-proof, and the auditor's summary. Upon receiving the transaction at the distributed ledger, blockchain, or the like, the validation module 312 may be configured to check the validity of the zk-proof based on the transaction payload.

The outgoing balance module 314 may be configured to track an outgoing balance of a user using ASC. The outgoing balance module 314 may include storing ASC in a decoupled state machine designed for outgoing balances. In some implementations, the ASCs may be stored in leaves of a Merkle tree, appending a new leaf for each ASC. According to some embodiments, the outgoing balance module 314 may be configured to generate and update nullifiers corresponding to ASCs. In some implementations, this includes generating a nullifier for the ASC using a private key of a user and appending a previous nullifier corresponding to a previous ASC ($ASC_{old}$) to a nullifier list comprising account state commitments that have been spent by the user. Adding a nullifier to the nullifier list may mark the ASC as spent by the user.

According to some embodiments, the outgoing balance module 314 may be configured to generate a unique leaf key corresponding to the ASC, mapping the ASC to the leaf key. The leaf key may be generated based on a private key of the user and a previous leaf key (or initial leaf key). Accordingly, a user may obtain a latest ASC using their private key.

The incoming balance module 316 may be configured to a sum of incoming balances. The incoming balances may be encrypted (at encryption module 308). According to embodiments, the incoming balance can only increase, therefore the encryption module 308 may employ solely homomorphic addition operations when encrypting the incoming balances. The incoming balance module 316 may map encrypted positive balances with public keys. The incoming balance module 316 may include storing the encrypted positive balances in a decoupled state machine designed for incoming balances. In some implementations, the encrypted positive balances may be stored in leaves of a Merkle tree, updating a leaf corresponding to the sender for each operation performed by that sender. This effectively enables users to safeguard their identity through Merkle proofs.

The hashing module 318 may be configured to generate a hash of the encrypted balances from incoming balance module 316. The encrypted balance is a positive balance determined based on a previous balance (before receiving an ASC) and an encrypted amount included in a transaction. The hashing module 318 may be further configured to replace hashes in leaves of the Merkle tree corresponding to the incoming balance.

The balance updating module 320 may be configured to update balances of users according to a state of the incoming and outgoing balances for a given transaction. In some implementations, the balance updating module 320 may atomically update an encrypted outgoing balance of a sender and a current encrypted balance of a receiver according to the transaction. By non-limiting example, this may include adding an encrypted amount to a receiver's encrypted positive balance (using homomorphic encryption properties). According to some embodiments, the balance updating module 320 may be configured to, upon decryption of the encrypted positive balance, updating a balance of a positive balance of a receiver. According to some embodiments, the balance updating module 320 may be configured to sum a deposit balance and a positive balance (stored in the incoming balances) and subtract a negative balance (stored in the outgoing balances) to determine an actual balance for an account.

In some implementations, the computing platform(s) 302, the remote platform(s) 304, and/or the external resources 324 may be operatively linked via one or more electronic communication links. For example, such electronic communication links may be established, at least in part, via the network 150 such as the Internet and/or other networks. It will be appreciated that this is not intended to be limiting, and that the scope of this disclosure includes implementations in which the computing platform(s) 302, the remote platform(s) 304, and/or the external resources 324 may be operatively linked via some other communication media.

A given remote platform 304 may include client computing devices, which may each include one or more processors configured to execute computer program modules. The computer program modules may be configured to enable an expert or user associated with the given remote platform 304 to interface with the system 300 and/or external resources 324, and/or provide other functionality attributed herein to remote platform(s) 304. By way of non-limiting example, a given remote platform 304 and/or a given computing platform 302 may include one or more of a server, a desktop computer, a laptop computer, a handheld computer, a tablet computing platform, a NetBook, a Smartphone, a gaming console, and/or other computing platforms. The external resources 324 may include sources of information outside of the system 300, external entities participating with the system 300, and/or other resources. For example, the external resources 324 may include externally designed blockchain elements and/or applications designed by third parties. In some implementations, some or all of the functionality attributed herein to the external resources 324 may be provided by resources included in system 300.

Computing platform(s) 302 may include the electronic storage 326, a processor such as the processors 330, and/or other components. The computing platform(s) 302 may include communication lines, or ports to enable the exchange of information with a network and/or other computing platforms. Illustration of the computing platform(s) 302 in FIG. 3 is not intended to be limiting. The computing platform(s) 302 may include a plurality of hardware, software, and/or firmware components operating together to provide the functionality attributed herein to the computing platform(s) 302. For example, the computing platform(s) 302 may be implemented by a cloud of computing platforms operating together as the computing platform(s) 302.

Electronic storage 326 may include non-transitory storage media that electronically stores information. The electronic storage media of the electronic storage 326 may include one or both of system storage that is provided integrally (i.e., substantially non-removable) with computing platform(s) 302 and/or removable storage that is removably connectable to computing platform(s) 302 via, for example, a port (e.g., a USB port, a firewire port, etc.) or a drive (e.g., a disk drive, etc.). Electronic storage 326 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 326 may include one or more virtual storage resources (e.g., cloud storage, a virtual private network, and/or other virtual storage resources). Electronic storage 326 may store software algorithms, information determined by the processors 330, information received from computing platform(s) 302, information received from the remote platform(s) 304, and/or other information that enables the computing platform(s) 302 to function as described herein.

Processor(s) 330 may be configured to provide information processing capabilities in computing platform(s) 302. As such, processor(s) 330 may include one or more of a digital processor, an analog processor, a digital circuit designed to process information, an analog circuit designed to process information, a state machine, and/or other mechanisms for electronically processing information. Although processor(s) 330 is shown in FIG. 3 as a single entity, this is for illustrative purposes only. In some implementations, processor(s) 330 may include a plurality of processing units. These processing units may be physically located within the same device, or processor(s) 330 may represent processing functionality of a plurality of devices operating in coordination. Processor(s) 330 may be configured to execute modules 308, 310, 312, 314, 316, 318, and/or 320, and/or other modules. Processor(s) 330 may be configured to execute modules 308, 310, 312, 314, 316, 318, and/or 320, and/or other modules by software; hardware; firmware;

some combination of software, hardware, and/or firmware; and/or other mechanisms for configuring processing capabilities on processor(s) 330. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 308, 310, 312, 314, 316, 318, and/or 320 are illustrated in FIG. 3 as being implemented within a single processing unit, in implementations in which processor(s) 330 includes multiple processing units, one or more of modules 308, 310, 312, 314, 316, 318, and/or 320 may be implemented remotely from the other modules. The description of the functionality provided by the different modules 308, 310, 312, 314, 316, 318, and/or 320 described below is for illustrative purposes, and is not intended to be limiting, as any of modules 308, 310, 312, 314, 316, 318, and/or 320 may provide more or less functionality than is described. For example, one or more of modules 308, 310, 312, 314, 316, 318, and/or 320 may be eliminated, and some or all of its functionality may be provided by other ones of modules 308, 310, 312, 314, 316, 318, and/or 320. As another example, processor(s) 330 may be configured to execute one or more additional modules that may perform some or all of the functionality attributed below to one of modules 308, 310, 312, 314, 316, 318, and/or 320.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 4A:
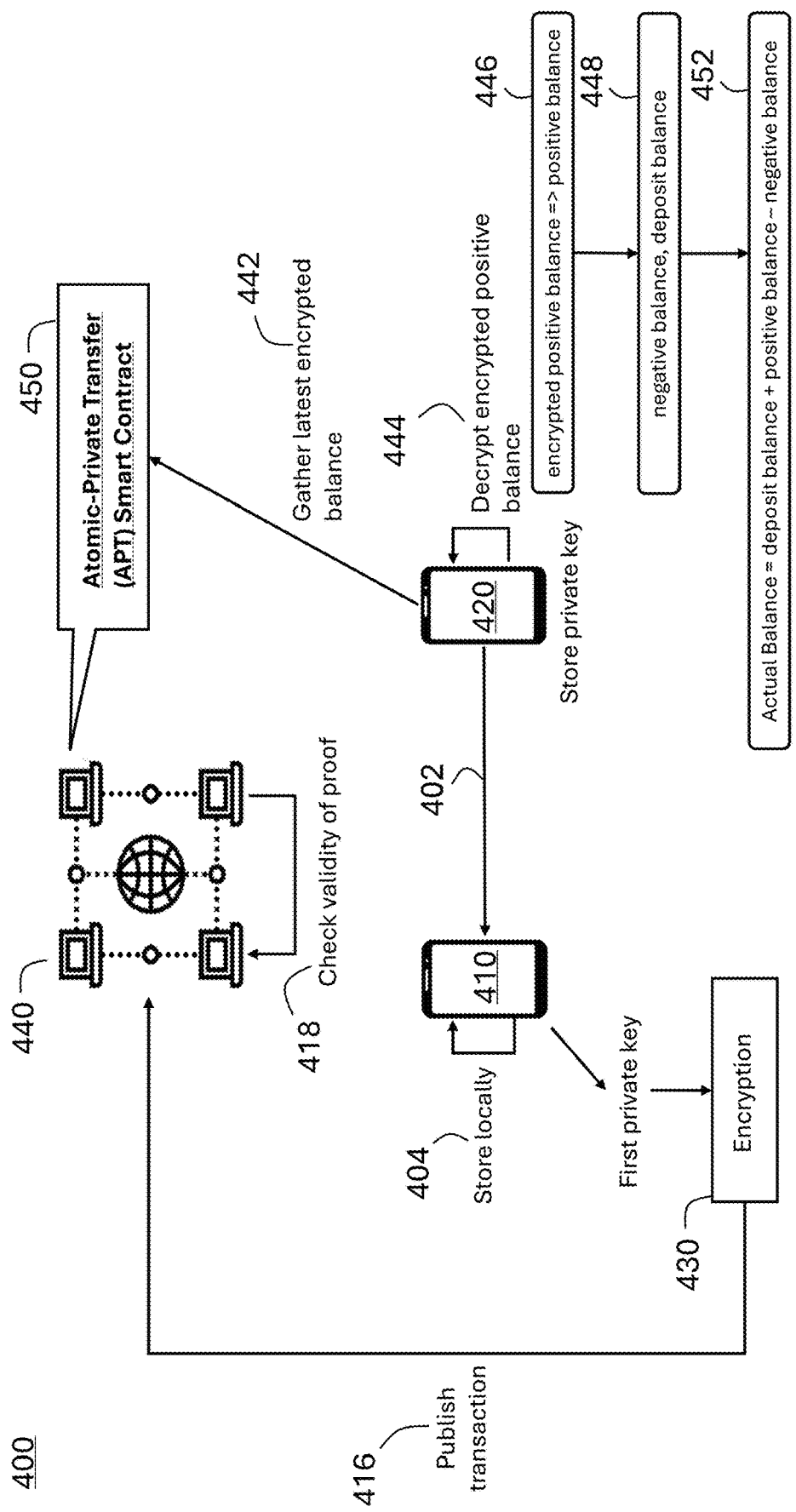
FIGS. 4A-4C illustrate aspects of a transaction flow, according to certain aspects of the present disclosure.
Figure 4B:
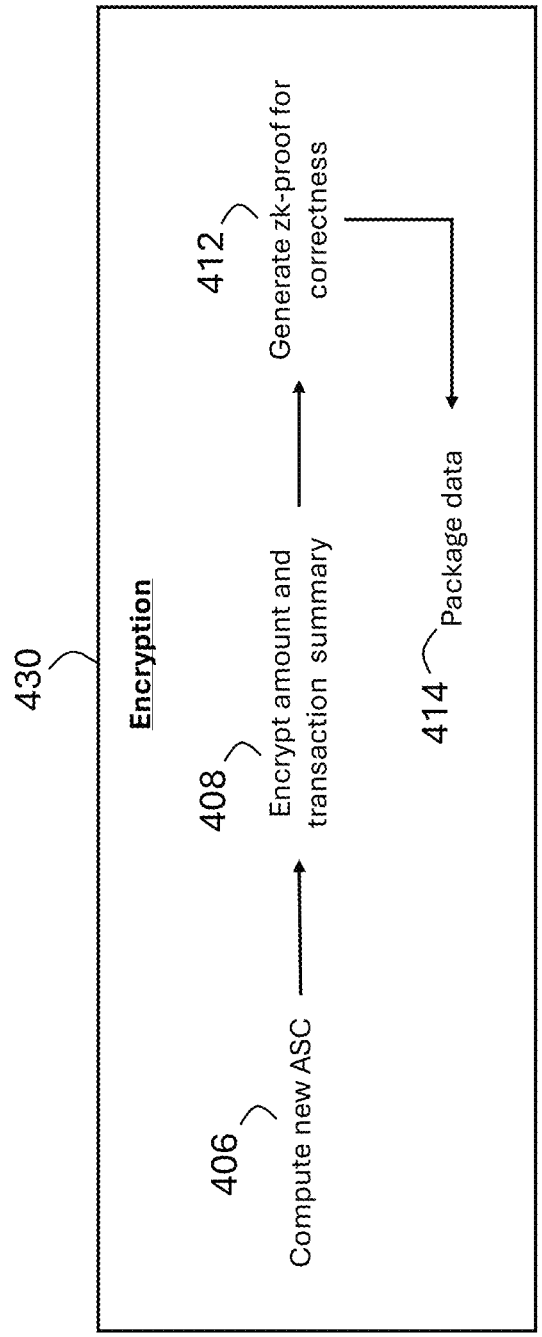
Figure 4C:
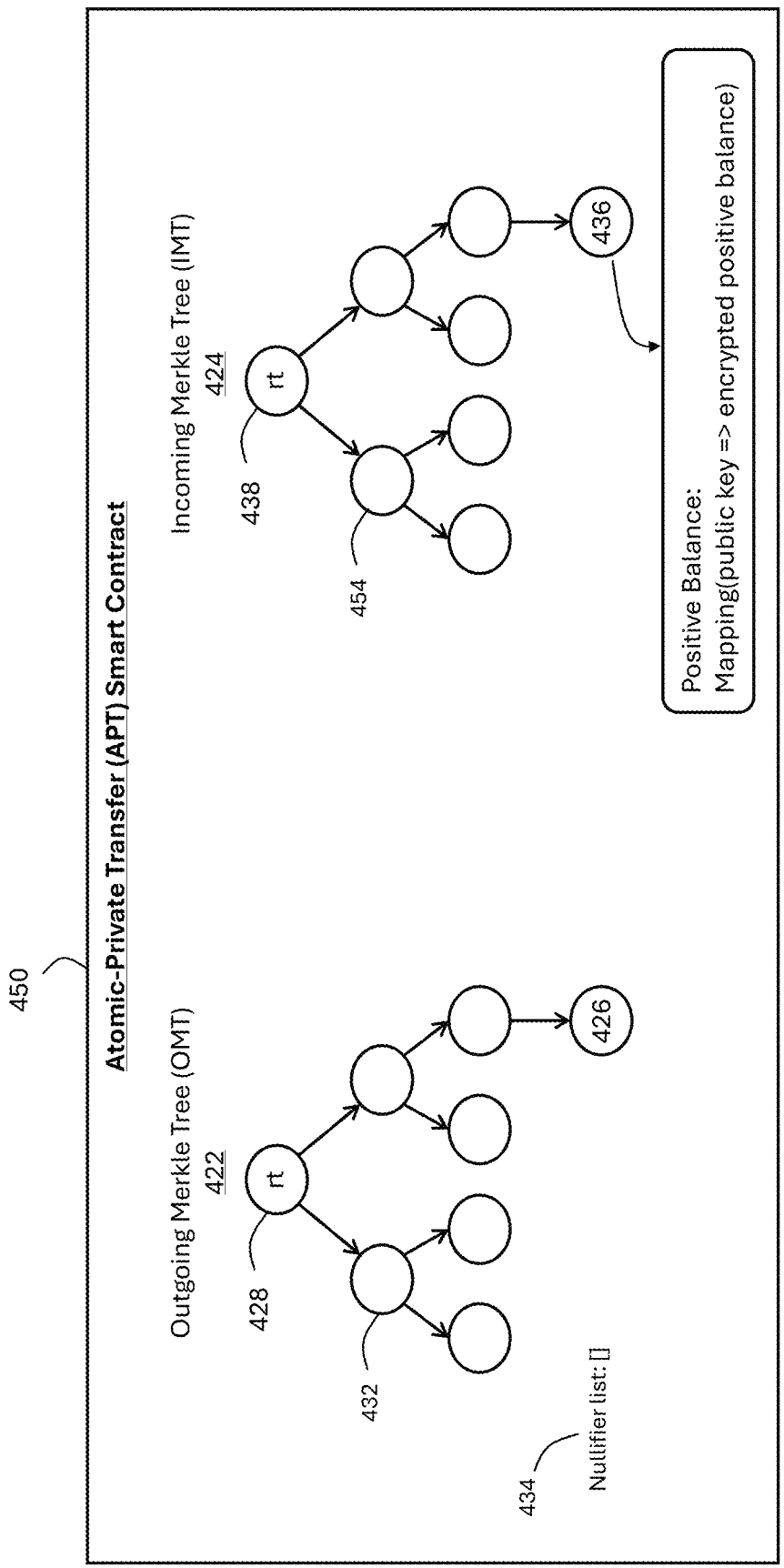

FIGS. 4A-4C illustrate aspects of a transaction flow 400, according to one or more embodiments. FIG. 4A illustrates an overview of the transaction flow 400 using atomic-private transfer smart contracts. The transaction flow 400 illustrates an exemplary transaction between a first user device 410 and a second user device 420 within a blockchain network 440 running the APT smart contract 450. A first user of the first user device 410 and a second user of the second user device 420 may interact with the blockchain network 440 and APT smart contract 450 through wallets, web browsers, or the like.

The first user may be associated with a private-public key pair. Similarly, the second user may be associated with a private-public key pair. By non-limiting example, the first user device 410 may store its private key (hereafter "first private key") locally in a secure enclave, or the like. The first user device 410 may store an ASC. The ASC represents a current state of a user's account (e.g., a balance of the account at a given time) and may be stored in an incremental Merkle tree. By non-limiting example, the second user device 420 may store its private key (hereafter "second private key") locally in a secure enclave, including but not limited to a hardware security module (HSM). Each of the first and second user current account balances are encrypted using their respective private keys.

The second user device 420 provides its public key (hereafter "second public key") 402 to the first user device 410. The second public key may be provided via an off-chain method including, but not limited to, short message service (SMS), social media, message, or the like. The first user device 410 may store the second public key locally 404 in, for example, the HSM of the second user device 420. A transaction may be initiated at the first user device 410 using, for example, the wallet, web browser, etc. The first public key (corresponding to first user device 410) and the second public key may be used in the encryption 430 to encrypt the transaction.

FIG. 4B illustrates a workflow of the encryption 430, according to some embodiments. The encryption 430 may implement a SNARK-friendly symmetric encryption scheme. In some embodiments, an ECEG encryption scheme is used, providing efficient encryption and decryption, particularly in applications involving zero-knowledge proofs, as well as its additively homomorphic properties.

According to embodiments, the encryption 430 may include computing a new ASC 406 based on the transaction. The ASC may include fields for an address of the owner (e.g., sender), an outgoing balance (e.g., net negative operations), and an incoming balance (i.e., net positive operations). According to embodiments, the outgoing balances include operations performed by the owner of an account (e.g., transfers, withdrawals, and deposits) and incoming balance includes deposits made from outside of the protocol to the address. According to embodiments, the encryption 430 may include encrypting an amount to be transferred and a transaction summary 408. The amount may be encrypted with the second public key. The encryption 430 may include encrypting the incoming and outgoing balances. In some embodiments, the incoming and outgoing balances are encrypted using a partially homomorphic encryption (PHE) algorithm.

According to embodiments, the APT smart contract 450 may employ a modified ECEG encryption algorithm wherein the transaction is encrypted using the first and second public keys. The modified ECEG encryption algorithm may include deconstructing the incoming and outgoing balances and leveraging the additive homomorphic properties of ECEG and CRT to reconstruct the values in the decryption process. Given the incoming balance can only increase and not decrease, the contract will execute solely homomorphic addition operations and not subtractions. This modification simplifies the lookup table to a single dimension, focusing exclusively on positive values.

The transaction summary may be encrypted with an auditor's public key. For auditability, the first user device 410 (sender) may create the encrypted summary of the transaction using ECDH encryption, addressing both the first user device 410 and the auditor. The transaction summary may include the addresses of both the sender (e.g., first user) and receiver (e.g., second user), alongside the unencrypted transaction amount. Such encryption assures that auditor acquires the requisite information for compliance purposes.

According to embodiments, the encryption 430 may include generating a zk-proof for correctness 412 of the encrypted amount and transaction summary. In order to prove ownership of an ASC, a user needs to generate a zero-knowledge proof that proves knowledge of the values in the ASC and reconstruction of it, and the ability to compute the $\text{addr}_{owner}$ using the first private key ($\text{user}_{sk}$). The zk-proof may be verified by a third-party without having any information about the contents of the transaction or decrypting and revealing underlying values (e.g., the amount, user balance, or user identity).

According to embodiments, the encryption 430 may include packaging the data 414 (i.e., the new ASC, the zk-proof, the encrypted amount, transaction summary, and the first and second public keys). The data may be packaged into a transaction payload. In some implementations, the package is signed via a random private key. In some embodiments, the transaction including the transaction payload may be signed using the random private key.

As shown in FIG. 4A, the transaction may be published 416 to an entity of the blockchain network 440. The published transaction may include the transaction payload. In some implementations, the transaction (including the transaction payload) is published to one of a node, validator, or miner computer of the blockchain via a remote procedure call (RPC) protocol (e.g., JSON-RPC/TCP). The blockchain network 440, or entity of the blockchain network 440, may receive the transaction and check the validity of the zk-proof 418 in the transaction payload. In some implementations, the entity may deduct gas fees from the user of the first user device 410.

Based on the transaction payload being valid, the APT smart contract 450 homomorphically modifies incoming and outgoing Merkle trees (IMT and OMT, respectively) and updates a state of the Merkle trees based on the transaction.

FIG. 4C is an illustration of the APT smart contract 450 adjustments and state updates, according to some embodiments. According to embodiments, the APT smart contract 450 may implement a decoupled account state (DAS) model wherein incoming and outgoing balances are maintained in separate data structures.

The APT smart contract 450 maintains an OMT 422 data structure and an IMT 424 data structure. According to embodiments, the incoming and outgoing balance may be included in the ASC. As shown in FIG. 4C, the OMT 422 may include ASC leaves (e.g., leaf 432). The OMT 422 may be an append-only incremental Merkle tree that is instantiated within the APT smart contract 450 and stores (in the leaves) the negative balance. According to embodiments, only the owner of an account can change the negative balance within an accumulator using zk-proofs given only the owner can authorize withdrawal or a transfer from their account. The ASC is randomized such that when an outgoing balance is updated by the owner, only the owner knows where the outgoing balance is stored, hiding the address of the owner (i.e., the sender being the first user).

The new ASC may be appended to the OMT 422 as a leaf 426, adding a new account state to the OMT 422. The new ASC may be hashed and stored in the leaf 426 (i.e., hash (addr, balance$_{negative}$+amount, random). A state root 428 of the OMT 422 is updated. A nullifier of the old ASC (ASC$_{old}$) is appended to a nullifier list 434 to mark it as spent without revealing data (i.e., nullifier=hash (ASC$_{old}$||first private key)).

The IMT 424 may include IMT leaves (e.g., leaf 454). The IMT 424 may be an updatable Merkle tree that is instantiated within the APT smart contract 450 and stores (in the leaves) the positive balance. According to embodiments, the IMT 424 is employed to circumvent the issue of identity leakage (e.g., inadvertently revealing the sender's identity during transfers) by maintaining users' positive balances. According to embodiments, IMT 424 is mapped to the first public key. As such, the first user (i.e., the owner) does not need to interact with the positive balance maintained in the IMT 424. The encrypted amount (from the transaction) is added to the second user's encrypted positive balance using homomorphic encryption to determine a new encrypted balance (i.e., new encrypted balance=old encrypted balance+encrypted amount).

According to some embodiments, the new encrypted positive balance of the second user is hashed and stored in the IMT. In some embodiments, the Poseidon hash function may be used to hash the new encrypted positive balance. The Poseidon hash function uses a sponge construction to handle variable input lengths and produce a fixed-size hash. This may be represented mathematically as H:$\{0,1\}^* \rightarrow \{0,1\}^n$, where H is the hash function, mapping an input of arbitrary length to an n-bit output. Its computational efficiency, measured by the number of gates in the arithmetic circuit, makes Poseidon ideal for blockchain applications with limited resources.

The IMT 424 uniquely stores the hash of the encrypted positive balance (e.g., hash (encrypted positive balance)) in a fixed position within a leaf 436. A state root 438 of the IMT 424 is updated accordingly. This design means that each user can only have one leaf in the IMT 424.

As shown in FIG. 4A, the second user device 420 may gather the latest encrypted balance (i.e., encrypted balance f) 442 by connecting to the blockchain entity, for example, via RPC protocols or the like. The second device 420 may decrypt the encrypted positive balance 444 using the second private key to obtain a new readable positive balance 446. The second device 420 may then extract the second user's negative balance and deposit balance 448 from the second user's ASC. An actual balance 452 may be obtained by summing the deposit balance and the positive balance and subtracting the negative balance.

Figure 5:
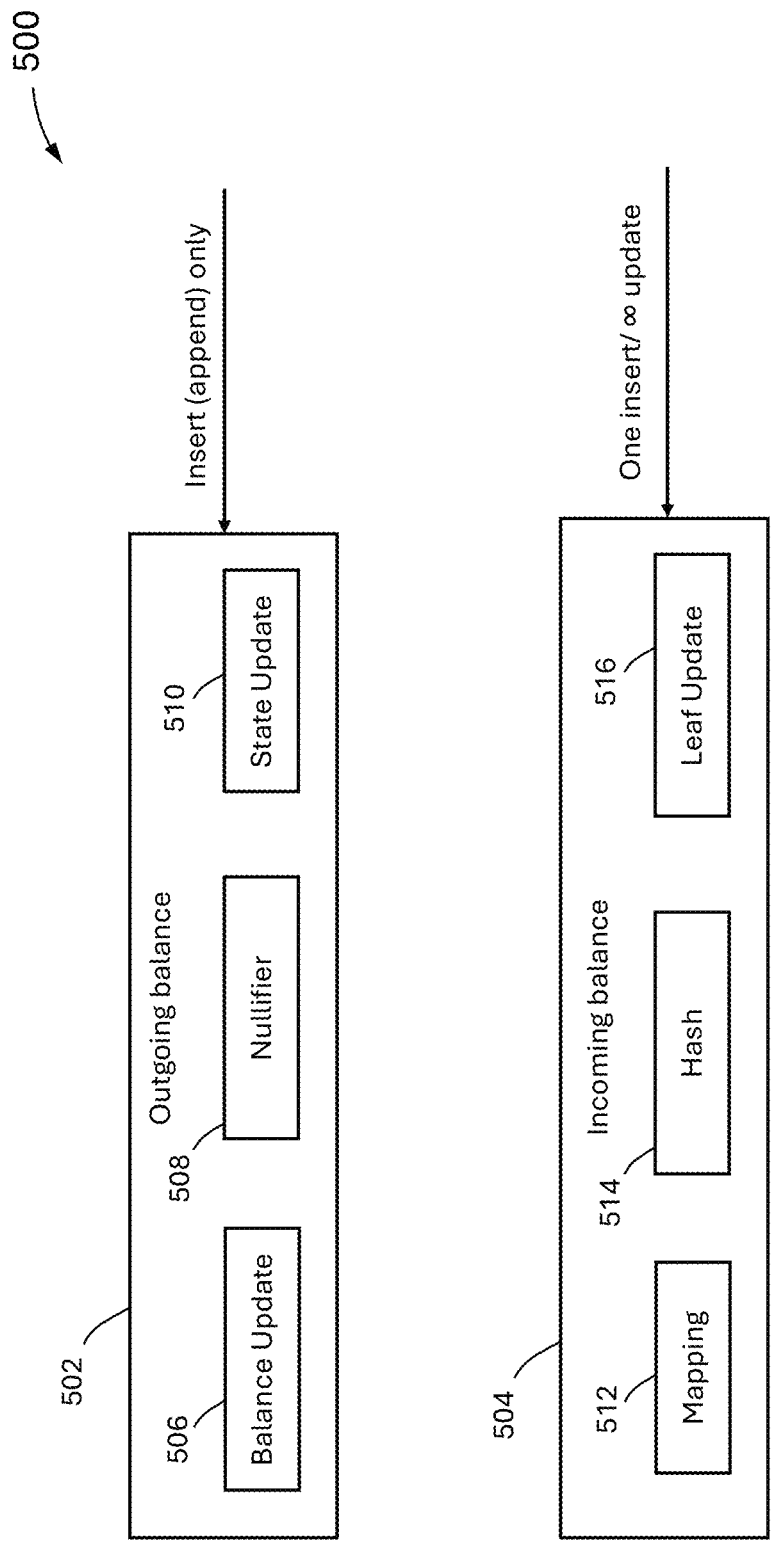
FIG. 5 is a block diagram illustrating a decoupled account state model structure implemented by APT smart contracts, according to certain aspects of the present disclosure.

FIG. 5 is a block diagram illustrating a DAS model structure 500 implemented by APT smart contracts, according to some embodiments. According to embodiments, DAS model structure 500 includes incoming and outgoing balances in separate data structures. Outgoing balance 502 and incoming balance 504 may represent the separate data structures. According to embodiments, the outgoing balance and identity of the sender (e.g., sender's address) may be kept private via ASCs and the outgoing balance and identity of the receiver (e.g., receiver's address) may may be kept private via encryption mechanisms. Balance of an account at any given time may be represented as:

$$\text{Balance} = \text{Balance}_{positive} - \text{Balance}_{negative} + \text{Balance}_{deposit} \quad \text{(Equation 1)}$$

The balance may be determined locally (e.g., at the first device 410 or the second device 420). The outgoing balance 502 is part of the ASC. The ASCs may be stored as leaves in an OMT for the outgoing balance 502. According to embodiments, a user can only have one unspent ASC in a state, compared to notes where users can own, send, or receive one or more notes in a state. According to embodiments, the ASC may only be owned. That is, the ASC cannot be sent or received to other users. The ASC may be spent in an operation that results in a decrease in the total balance of an account. The operation requires a user (sender) to generate a nullifier for ASC$_{old}$, marking it as spent and creating ASC$_{new}$ with the increase in the balance$_{negative}$ or balance$_{deposit}$ with a fresh randomness.

Nullifier 508 may be configured to generate a nullifier for ASCs using the user's private key to prevent double spending. Since the construction of the nullifier includes the usage of the private key of the user, a third party cannot link an ASC to its nullifier without the knowledge of the first private key of the account. After an ASC has been spent, and a new ASC is created, the corresponding account's state has been changed (at state update 510), and because only the owner of that account can do this operation, the owner can easily track a latest ASC. Since the operations that only the owner of an account can perform are deposit, withdraw, and transfer operations, all of those are performed using ASC (i.e., in an OMT accumulator) for increased anonymity and privacy.

Balance update 506 may be configured to update the outgoing balance according to the ASC. Since both withdrawal and transfer are negative operations, they can be performed by updating balance$_{negative}$ (e.g., increasing the balance$_{negative}$ by the encrypted amount). Given the deposit is a positive operation, it has its own field (i.e., balance$_{deposit}$) to be increased. According to embodiments, the owner of an ASC cannot decrease the values inside, and the values are protected by the zk-proof circuit. These values only can go up and not down, eliminating double spending issues that might occur from false ASCs.

By non-limiting example, the ASC may be computed as:

$$ASC = CRH(addr_{owner}, balance_{negative}, balance_{depoist}, random) \quad \text{(Equation 2)}$$

Where addr$_{owner}$ is the address of the account, balance$_{negative}$ is the outgoing balance of the account, and balance$_{deposit}$ is the positive total deposits made from outside of the protocol to the account, and randomness is the randomly generated $F_p$ element. In some embodiments, the commitment may include one or more other balances and/or fields (e.g., IDs).

The user generates a zk-proof that proves knowledge of the values in the ASC and reconstruction of it, and the ability to compute the addr$_{owner}$ using the first private key (user$_{sk}$). The zk-proof may be verified by a third-party without having any information about the contents of the transaction or decrypting and revealing underlying values (e.g., the amount, user balance, or user identity). Since ASC can be reconstructed if and only if a user knows the values inside (openings), the owner needs to save those values (openings of the ASC) to the APT smart contract 450 by encrypting them using a SNARK-friendly symmetric encryption scheme to obtain and use it at a future time. These encrypted commitment values are denoted as PCT$_{ASC}$ and may be encrypted using ECDH with Poseidon Encryption and saved in a mapping in the smart contract corresponding to the ASC.

According to embodiments, an ASC can have one unique Leaf Key. The unique leaf key may enable users to track their ASCs. The latest PCT, along with other values, are stored in the user's wallet for convenience. If a user loses access to their wallet, but not their private key, or if that user wants to enter their account from another device using the private key, since the new wallet or device cannot know the latest ASC or its PCT, it would require for it to brute force all PCTs of all ASCs in the accumulator, which is unpractical. The unique Leaf Key enables an owner of an ASC to securely determine the position of their latest ASC, without anyone else learning any information. The process for obtaining the position of the latest ASC is linear, O(n), and requires the user to only calculate his nullifiers. At the register, all users must generate a large random field element, $r_{ilk}$, and encrypt it using symmetric encryption resulting in PCT$_{ilk}$.

Then, using $r_{ilk}$ and user$_{sk}$, the initial leaf key denoted as leafKey$_{initial}$ or ilk is calculated as:

$$leafKey_{initial} = PH(r_{ilk}, user_{sk}) \quad \text{(Equation 3)}$$

Given the initial leaf key (leafKey$_{initial}$) is generated using a user's secret key, only the user can recompute it and the leafKey$_{initial}$ may be used to identify the user's account. According to embodiments, leafKey$_{initial}$ may be sent within a register transaction (e.g., at initialization) to the APT smart contract as well as the PCT$_{ilk}$. The APT smart contract then saves PCT$_{ilk}$ to the contract's respective mapping. That is, anyone can query it using a public key, but only the owner of it can decrypt it. The initial leaf key may be saved to another mapping where a user can query it using ASC$_{leaf}$ or ASC$_{idx}$. After the initial leaf key is constructed and saved, if a user conducts an operation that requires a new ASC, the next leaf key may be calculated using the previous leaf key. If the most recent leaf key of a user is the initial leaf key, the next leaf key may be constructed as follows: leafKey$_{new}$=PH (leafKey$_{initial}$, user$_{sk}$). If the previous leaf key is another leaf key different from the initial leaf key, the next leaf key may be constructed as: leafKey$_{new}$=PH(leafKey$_{old}$, user$_{sk}$).

According to embodiments, all leaf keys may be saved to another mapping where the user may query an ASC$_{leaf}$ or ASC$_{idx}$ using a leaf key. Given each new ASC is mapped to a leaf key calculated using the user's private key, only the owner can see the link between them.

According to embodiments, since only the owner of an ASC can relocate his ASC, the owner may create leaf keys similar to the linked lists but in a private manner, where each element is connected to the next element, just like the blockchain itself. As a result, if a user logs out from a previous wallet which has been saving the user's ASC information locally, and enters from a new (fresh) device or wallet, the user may obtain the latest ASC using only the private key.

Table 1 below includes steps in an ASC retrieval algorithm that may be run to retrieve a latest ASC in O(n) time, according to one or more embodiments. The ASC retrieval algorithm allows users to obtain their latest ASCs in an iterative and efficient manner.

TABLE 1

ASC Retrieval Algorithm

RetrieveASC$_{Client}$ (usk,upk):
  PCT$^{ilk}$ ← Evacy$_{SC}$.GetKey(upk)
  r$^{ilk}$ ← SE.Dec$_{usk}$(PCT$^{ilk}$)
  ilk ← CRH(r$^{ilk}$ ∥ usk)
  OMT$^{leaf}$ ← Evacy$_{SC}$.GetOMTLeaf(ilk)
  nf ← CRH(OMT$^{leaf}$ ∥ usk)
  if nf ∉ ⊥ then
    return OMT$^{leaf}$
  else do
    leafKey$_n$ ← CRH( leafKey$_{n-1}$ ∥ usk)
    OMT$^{leaf}$ ← Evacy$_{SC}$.GetOMTLeaf(leafKey$_n$)
    nf ← CRH(OMT$^{leaf}$ ∥ usk)
    if nf ∉ ⊥ then
      return OMT$^{leaf}$
    end if
  end if The incoming balance 504 of a user represents the total sum that other users will add to when conducting transfers to a given user. To ensure security and privacy, the incoming balance 504 is encrypted (e.g., using a PHE algorithm). Mapping 512 may be configured to map an encrypted balance to a public key of the user (e.g., mapping (publicKey=>encryptedBalance) IncomingBalances), connecting the incoming balance 504 to the user.

According to embodiments, hash 514 may be configured to generate a hash of the encrypted balance, generating an IMT leaf corresponding to the user (e.g., an account of the user). That is, the leaf represents a hash of the ciphertext corresponding to the encrypted balance. According to embodiments, only an initial value is appended (i.e., insert) to the IMT for incoming balance 504 and, thereafter, the value may be updated. Leaf update 516 may infinitely update inserted values (e.g., the hash) based on new encrypted balances. Without leaf update 516 updating hashes, users would have to provide their encryptedBalance as a public input to the zk-SNARK circuit to execute a transfer, and demonstrate to the contract that their total balance is sufficient for the transaction. This requirement arises because the contract must learn and verify whether the user has correctly decrypted and proven their correct balance. However, such a process would inadvertently reveal the sender's identity during transfers. To circumvent this issue of identity leakage, while also avoiding a reduction in the anonymity set (as would occur with group signature schemes or similar), the IMT updates a previous leaf based on a new transaction.

According to embodiments, when a user receives a transfer, the APT smart contract homomorphically adds the encrypted transfer amount to the receiver's existing encrypted balance. Subsequently, the hash of this new balance replaces the previous hash in the IMT leaf. Therefore, a new leaf may be inserted in the IMT when a user registers (e.g., registration module 308) in the APT protocol, and the only permissible operation on a user's leaf thereafter is an update. Without this update operation, senders would have to generate nullifiers for the receiver's prior leaves, an impractical requirement as it necessitates the sender's private key. It would also lead to a search operation (due to the changing position of the leaf without the owner's consent), which is undesirable. The use of the IMT for storing the hash of the encrypted positive balances enables users to validate their balance ownership through a Merkle proof, effectively safeguarding their identity.

Figure 6:
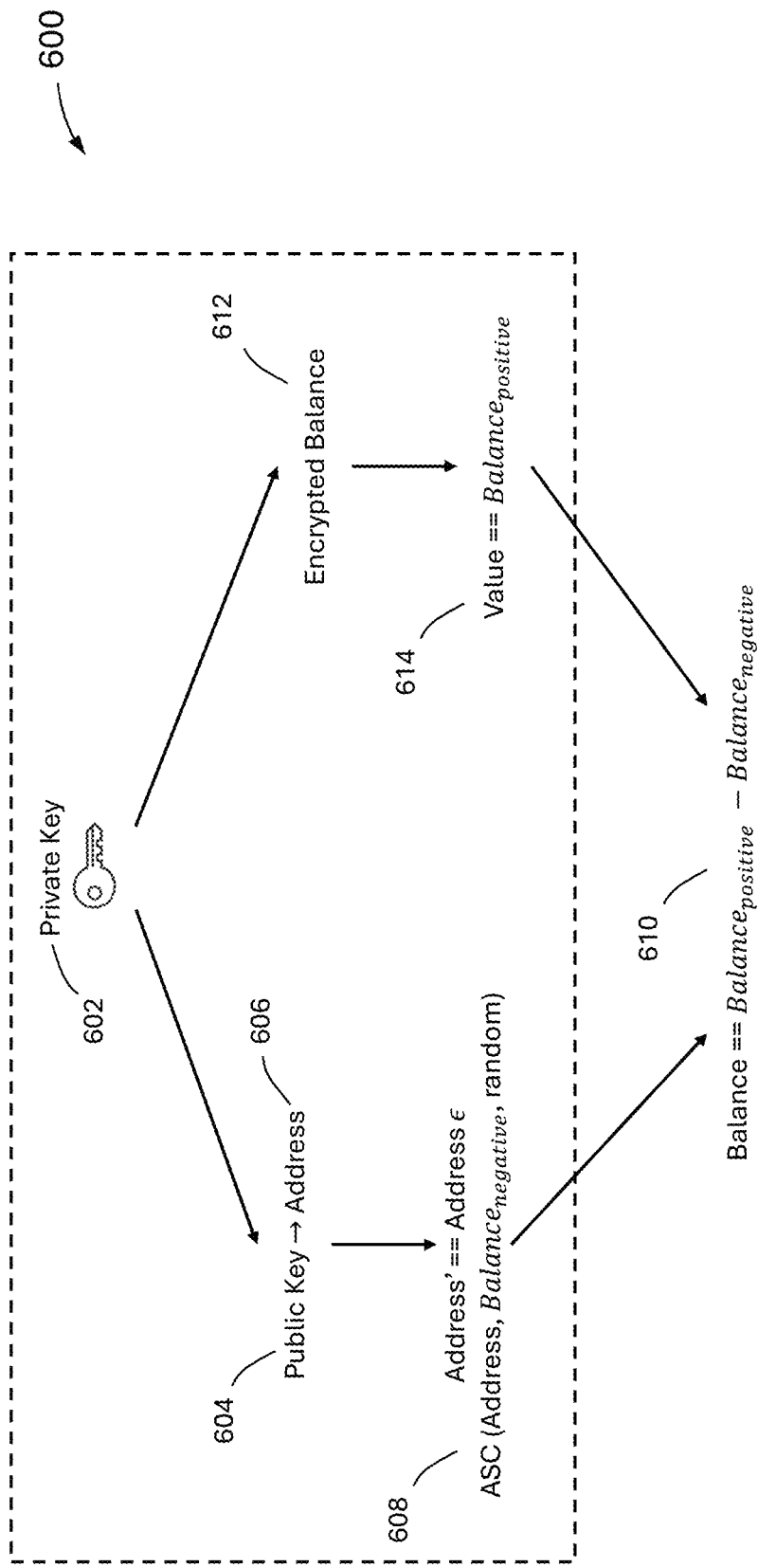
FIG. 6 is a block diagram illustrating logic within a zk-proof circuit and the outgoing and incoming balances, according to certain aspects of the present disclosure.

FIG. 6 is a diagram illustrating logic within a zk-proof circuit and the outgoing and incoming balances, according to one or more embodiments. According to embodiments, users may create a private key 602. A public key 604 may be derived from the private key 602. The public key 604 may be used to derive an address 606. A proof may be generated to show ownership of the address 606. The address 606 may be included in an ASC 608 in a Merkle tree (e.g., OMT 422). The ASC, in addition to the address, may include a value for the negative balance associated with an account of the user and randomness. A zk-proof may be used to demonstrate knowledge of the values in the ASC, proving ownership (e.g., the owner of the private key is the correct owner of the address).

According to embodiments, the private key 602 may decrypt an encrypted balance 612. The encrypted balance 612 may be stored in a Merkle tree (e.g., IMT 424). Encrypted balance 612 may include a value 614 of a positive balance associated with the user's account, connecting the positive and negative balances of the account via the private key 602. A total balance 610 of the account may be the difference between the positive and negative balances.

Figure 7:
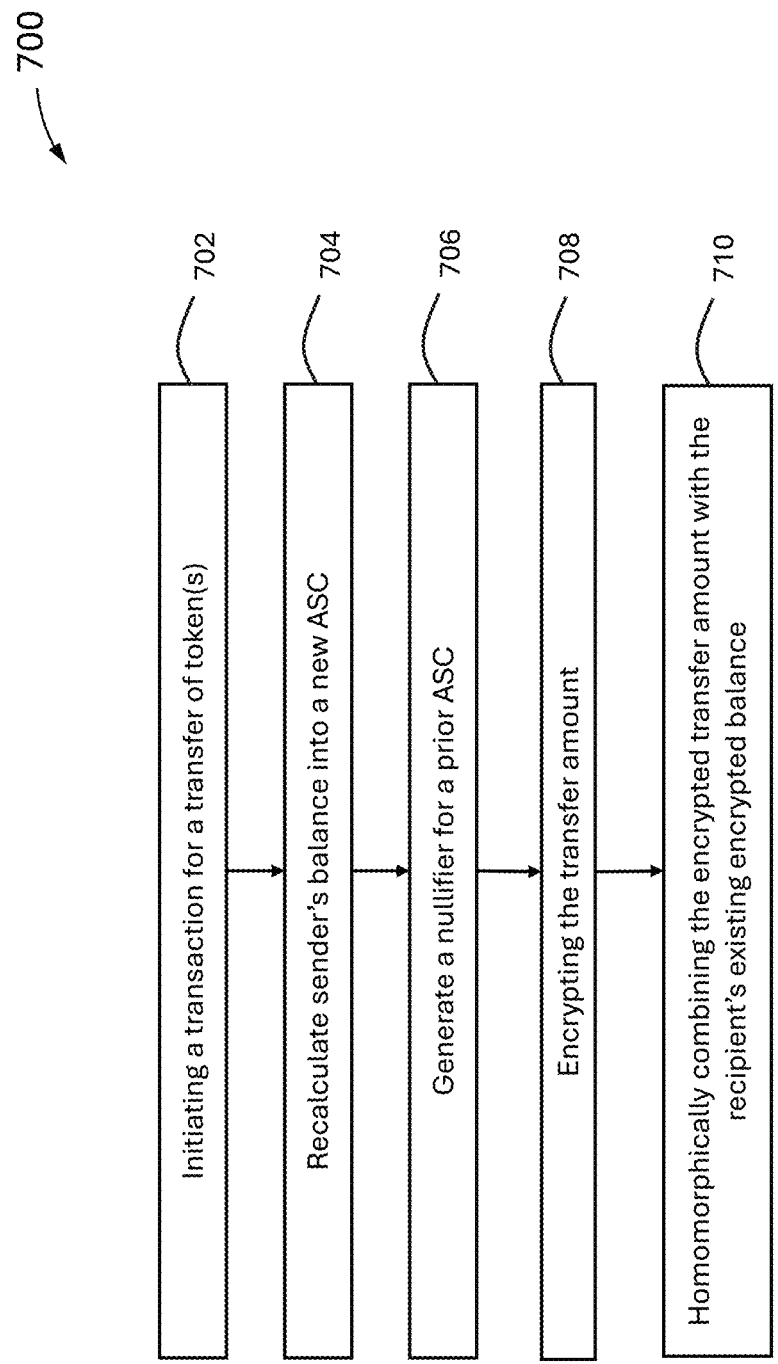
FIG. 7 illustrates exemplary operations in a process of a transfer protocol within the APT framework, according to certain aspects of the present disclosure.

FIG. 7 illustrates exemplary operations in a process 700 of a transfer protocol within the APT framework, according to one or more embodiments. According to embodiments, the APT transfer protocol is designed to secure private transactions between users, ensuring both anonymity and confidentiality by integrating homomorphic encryption with accumulators.

According to embodiments, a sender, utilizing their private key, can verify their ownership of an ASC and balance, while maintaining anonymity. The sender's positive balance is authenticated through a membership proof within the IMT, and the negative balance via a membership proof in the OMT, with no disclosure of identity.

At operation 702, the process 700 may include initiating a transaction for a transfer of token(s). The transfer may be initiated by a sender. At operation 704, the process 700 may include generating a new ASC based on a transfer amount of the transaction. In some embodiments, generating the new ASC may include recalculating the sender's balance into a new ASC. At operation 706, the process 700 may include generating a unique nullifier for a prior ASC of the sender. This ensures that the transaction cannot be traced back to the sender. At operation 708, the process 700 may include encrypting the transfer amount using a recipient's public key. At operation 710, the process 700 may include homomorphically combining the encrypted transfer amount with the recipient's existing encrypted balance, safeguarding the value of the transaction. The only potentially visible data to an observer is the recipient's public key.

According to embodiments, all transfers may be processed via a confidentiality-preserving token mechanism. As such, the recipient's preceding balance remains hidden due to the elliptical curve (EC) encryption mechanism (e.g., implemented by encryption module 308). Accordingly, external observers can only detect a transition in the receiver's encrypted balance from one encrypted form to another.

According to embodiments, the transfer protocol may implement a group-based method. In the transfer protocol, the sender's address is completely hidden, but the receiver's address may be public. To improve the receiver-level privacy, the transfer protocol may employ the group-based method, which includes a plurality of receiver addresses for each transaction. One of the receiver addresses is the actual receiver and the remaining addresses are intended to conceal the identity of the actual receiver's address. In some embodiments, the sender may encrypt zero in the transaction sent to the remaining addresses. As such, third parties will see that a transaction has multiple receivers, but only one of them is the real receiver.

According to embodiments, a deposit and/or withdrawal pertains to the transfer of tokens into and out of an APT system. All deposits and withdrawals may be processed through ASCs. In some implementations, the deposit and/or withdrawal may be from a different blockchain using a bridge that relays the proof. In some implementations, the APT operates as a smart contract (e.g., APT smart contract 450) on an existing chain, by transferring tokens to an APT protocol contract.

According to embodiments, for a deposit, a user must generate a new ASC (e.g., at operation 704) that incorporates a new balance (deposit$_{balancenew}$). The new balance may be calculated as the sum of the previous deposit balance (deposit$_{balanceold}$) and the deposit amount (deposit$_{amount}$). The user is responsible for producing a zero-knowledge proof that verifies the accurate computation of these values, as well as the other parameters such as a nullifier and Merkle inclusion proof for the old ASC. During this process, the deposit$_{amount}$ is provided as a public input, allowing the transfer protocol to verify the congruence between the tokens transferred and the deposit$_{amount}$ and ensuring that users cannot falsely inflate their balances.

According to embodiments, since the balance$_{negative}$ field within the ASC already accounts for total outgoing amounts, no additional field is needed for withdrawals. For a withdrawal, users may create a new ASC with an incremented balance$_{negative}$ based on the withdrawal amount. The APT protocol contract subsequently disburses the specified withdrawal amount (amount$_{withdraw}$) to a user-designated address. This mechanism allows users to withdraw to a different address than the one used for deposit.

According to embodiments, both deposit and withdrawal transactions require the calculation of an encrypted transaction summary PCT$_{auditor}$ (encrypted using an auditor's key) which is essential for auditability. This feature ensures that illicit activities can be detected and reported to regulatory authorities, balancing the APT system's privacy features with the need for regulatory compliance.

Figure 8:
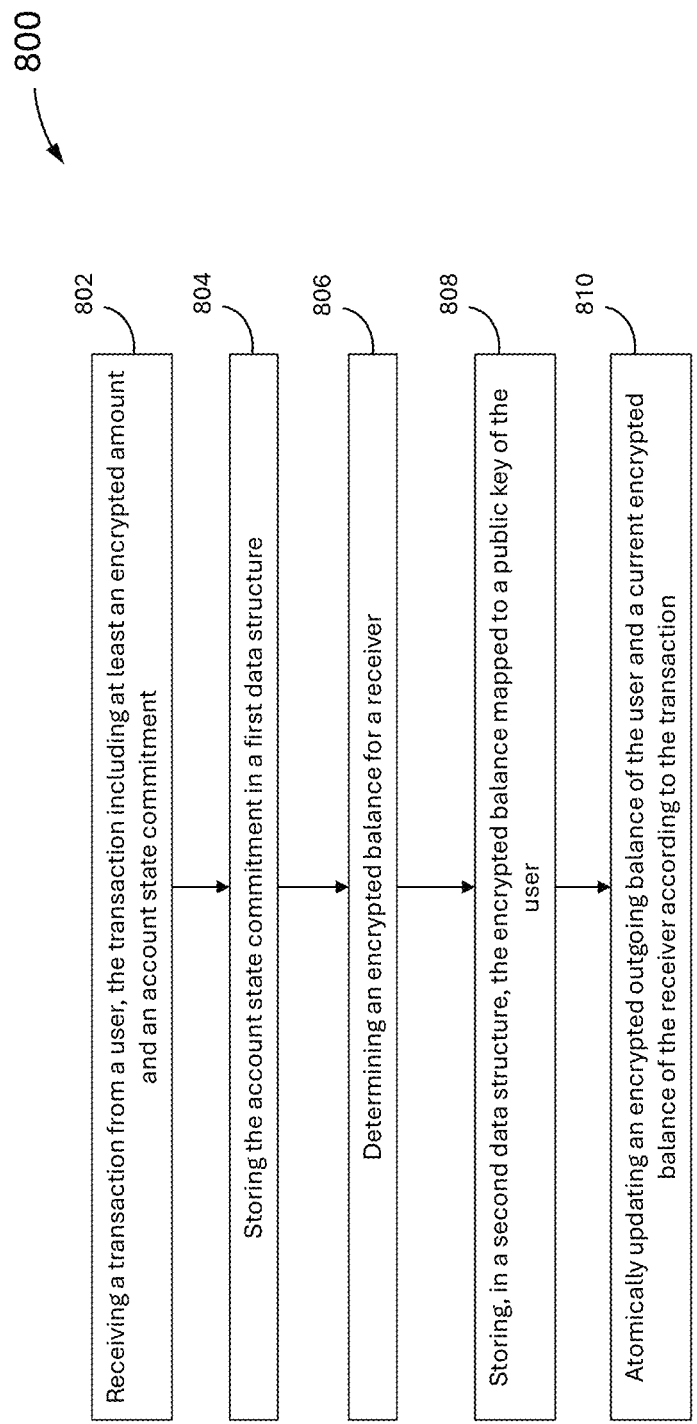
FIG. 8 illustrates exemplary operations in a process of a transfer protocol for using zk-morphic proofs within the encrypted ERC framework, according to certain aspects of the present disclosure.

FIG. 8 illustrates an example flow diagram (e.g., process 800) for implementing secure transfers in a distributed ledger, according to certain aspects of the disclosure. For explanatory purposes, the steps of the example process 800 are described herein as occurring in serial, or linearly. However, multiple instances of the example process 800 may occur in parallel, overlapping in time, almost simultaneously, or in a different order from the order illustrated in the process 800. In addition, the blocks of the example process 800 need not be performed in the order shown and/or one or more of the blocks of the example process 800 need not be performed.

At step 802, the process 800 may include receiving a transaction from a user, the transaction including at least an encrypted amount and an account state commitment. According to embodiments, the encrypted amount may be encrypted using a public key of the user. The transaction may include, for example, the public key, an address of an account of the user, an address of an account of the receiver, and a zero-knowledge proof. The zero-knowledge proof may prove ownership of the address and prove knowledge of values included in the account state commitment.

According to embodiments, the account state commitment may be generated to represent a partial state of an account of the user. The account state commitment may include at least an address of the user and an encrypted outgoing balance.

According to some embodiments, the first data structure may correspond to an outgoing Merkle tree tracking a state of an outgoing balance including operations that result in a decrease in a total balance of an account of the user.

According to some embodiments, the second data structure may correspond to an incoming Merkle tree tracking a state of an incoming balance including operations made from an outside account that result in an increase in a total balance of an account of the user.

According to some embodiments, the process 800 may include generating a transaction summary for auditability of the transaction. The transaction summary may include an address of the user, address of the receiver, and a transaction amount. The transaction summary may be encrypted using a shared secret key generated based on an auditor public key. According to embodiments, the encrypted transaction summary may be included in the transaction, and an auditor private key corresponding to the auditor public key may be used to decrypt the encrypted transaction summary.

At step 804, the process 800 may include storing the account state commitment in a first data structure. According to some embodiments, the process 800 may include generating a hash of the account state commitment and storing the hash of the account state commitment in the first data structure. According to some embodiments, the account state commitment is stored as a leaf in the outgoing Merkle tree. According to some embodiments, the hash of the account state commitment is appended to the first data structure as a leaf. According to some embodiments, the process 800 may include generating a hash of the encrypted balance, wherein the hash updates a previous hash in a fixed position associated with the user within the second data structure.

According to embodiments, the process 800 may include generating a nullifier for the account state commitment using a private key of the user and appending a previous nullifier corresponding to a previous account state commitment to a nullifier list. The nullifier list may include account state commitments that have been spent by the user and aid in tracking transfers in the Merkle trees.

According to embodiments, the process 800 may include generating, based on a private key of the user and a previous leaf key, a unique leaf key corresponding to the account state commitment. The unique leaf key may be stored in a mapping including account state commitments and leaf keys. Users may query the mapping to identify a latest account state commitment using their private keys.

At step 806, the process 800 may include determining an encrypted balance for a receiver based on the encrypted amount and a latest encrypted balance of the receiver.

At step 808, the process 800 may include storing, in a second data structure, the encrypted balance mapped to a public key of the user.

At step 810, the process 800 may include atomically updating an encrypted outgoing balance of the user and a current encrypted balance of the receiver according to the transaction.

According to some embodiments, the account state commitment may include a deposit balance. Based on the account state commitment including the deposit balance, the process 800 may include determining a deposit amount and updating a total encrypted balance of the user in the first data structure.

The techniques described herein (for example, process 800) may be implemented as method(s) that are performed by physical computing device(s); as one or more non-transitory computer-readable storage media storing instructions which, when executed by computing device(s), cause performance of the method(s); or as physical computing device(s) that are specially configured with a combination of hardware and software that causes performance of the method(s).

In some implementations, one or more operation blocks of FIG. 8 may be performed by a processor circuit executing instructions stored in a memory circuit, in a client device, a remote server or a database, communicatively coupled through a network (e.g., processors 205, memories 220, participants 110, participants 130, database(s) 152, and network 150).

Although FIG. 8 shows example blocks of the process 800, in some implementations, the process 800 may include additional blocks, fewer blocks, different blocks, or differently arranged blocks than those depicted in FIG. 8.

Hardware Overview

Figure 9:
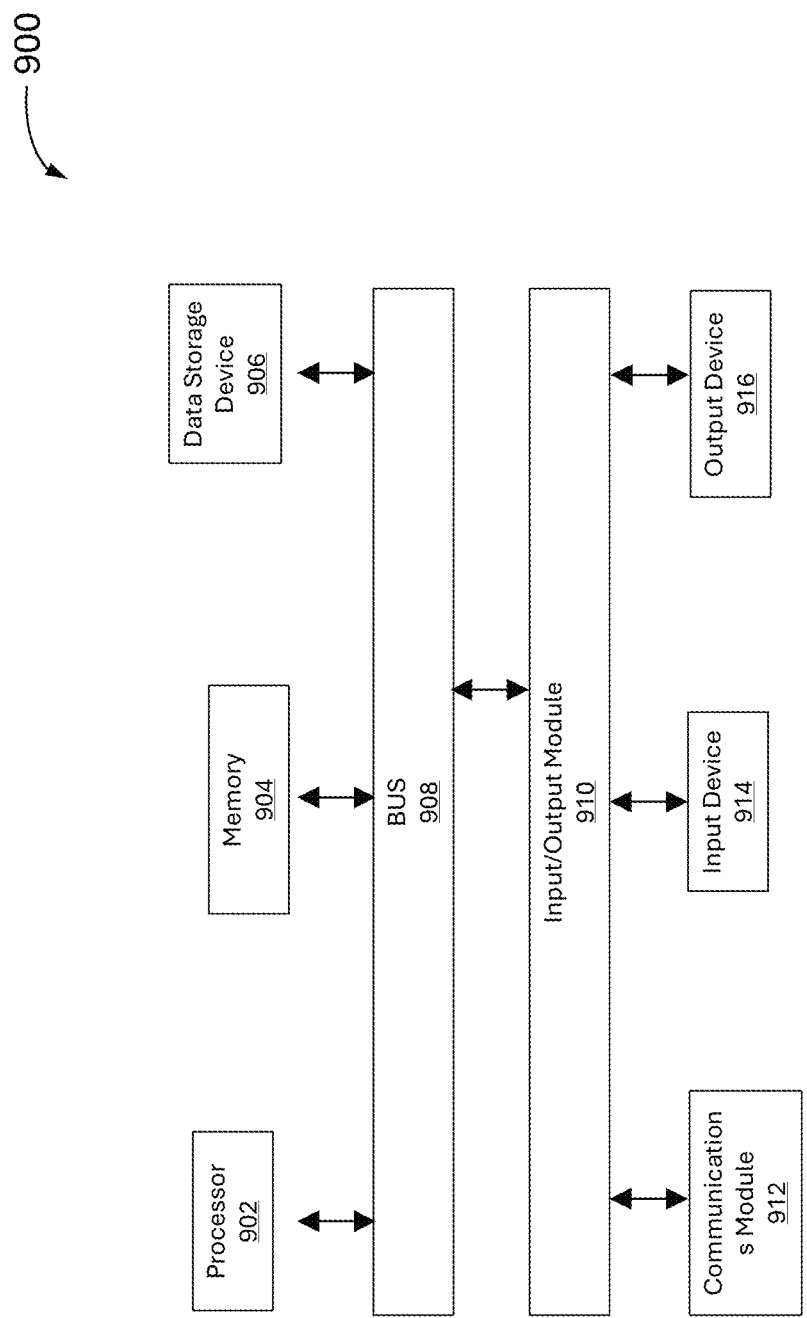
FIG. 9 is a block diagram illustrating an example computer system with which aspects of the subject technology can be implemented.

FIG. 9 is a block diagram illustrating an exemplary computer system 900 with which aspects of the subject technology can be implemented. In certain aspects, the computer system 900 may be implemented using hardware or a combination of software and hardware, either in a dedicated server, integrated into another entity, or distributed across multiple entities.

The computer system 900 (e.g., server and/or participant) includes a bus 908 or other communication mechanism for communicating information, and a processor 902 (e.g., processors 205) coupled with the bus 908 for processing information. By way of example, the computer system 900 may be implemented with one or more processors 902. Each of the one or more processors 902 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

The computer system 900 can include, in addition to hardware, code that creates an execution environment for the computer program in question, e.g., code that constitutes processor firmware, a protocol stack, a database management system, an operating system, or a combination of one or more of them stored in an included memory 904, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 908 for storing information and instructions to be executed by processor 902. Processor 902 and memory 904 can be supplemented by, or incorporated in, special purpose logic circuitry.

The instructions may be stored in memory 904 and implemented in one or more computer program products, i.e., one or more modules of computer program instructions encoded on a computer-readable medium for execution by, or to control the operation of, the computer system 900, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 904 may also be used for storing temporary variable or other intermediate information during execution of instructions to be executed by the processor 902.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

The computer system 900 further includes a data storage device 906 such as a magnetic disk or optical disk, coupled to bus 908 for storing information and instructions. The computer system 900 may be coupled via input/output module 910 to various devices. The input/output module 910 can be any input/output module. Exemplary input/output modules 910 include data ports such as USB ports. The input/output module 910 is configured to connect to a communications module 912. Exemplary communications modules 912 include networking interface cards, such as Ethernet cards and modems. In certain aspects, the input/output module 910 is configured to connect to a plurality of devices, such as an input device 914 and/or an output device 916. Exemplary input devices 914 include a keyboard and a pointing device, e.g., a mouse or a trackball, by which a user can provide input to the computer system 900. Other kinds of input devices can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 916 include display devices such as an LCD (liquid crystal display) monitor, for displaying information to the user.

According to one aspect of the present disclosure, the above-described systems can be implemented using a computer system 900 in response to the processor 902 executing one or more sequences of one or more instructions contained in the memory 904. Such instructions may be read into memory 904 from another machine-readable medium, such as data storage device 906. Execution of the sequences of instructions contained in the main memory 904 causes the processor 902 to perform the process steps described herein. One or more processors in a multi-processing arrangement may also be employed to execute the sequences of instructions contained in the memory 904. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

The computer system 900 can include clients and servers. A client and server are generally remote from each other and typically interact through a communication network. The relationship of client and server arises by virtue of computer programs running on the respective computers and having a client-server relationship to each other. The computer system 900 can be, for example, and without limitation, a desktop computer, laptop computer, or tablet computer. The computer system 900 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to the processor 502 for execution. Such a medium may take many forms, including, but not limited to, non-volatile media, volatile media, and transmission media. Non-volatile media include, for example, optical or magnetic disks, such as the data storage device 906. Volatile media include dynamic memory, such as the memory 904. Transmission media include coaxial cables, copper wire, and fiber optics, including the wires that comprise the bus 908. Common forms of machine-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

Many of the above-described features and applications may be implemented as software processes that are specified as a set of instructions recorded on a computer-readable storage medium (alternatively referred to as computer-readable media, machine-readable media, or machine-readable storage media). When these instructions are executed by one or more processing unit(s) (e.g., one or more processors, cores of processors, or other processing units), they cause the processing unit(s) to perform the actions indicated in the instructions. Examples of computer-readable media include, but are not limited to, RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra-density optical discs, any other optical or magnetic media, and floppy disks. In one or more embodiments, the computer-readable media does not include carrier waves and electronic signals passing wirelessly or over wired connections, or any other ephemeral signals. For example, the computer-readable media may be entirely restricted to tangible, physical objects that store information in a form that is readable by a computer. In some embodiments, the computer-readable media is non-transitory computer-readable media, or non-transitory computer-readable storage media.

In one or more embodiments, a computer program product (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network. While the above discussion primarily refers to microprocessor or multi-core processors that execute software, one or more embodiments are performed by one or more integrated circuits, such as application specific integrated circuits (ASICs) or field programmable gate arrays (FPGAs). In one or more embodiments, such integrated circuits execute instructions that are stored on the circuit itself.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

It should be understood that the original applicant herein determines which technologies to use and/or productize based on their usefulness and relevance in a constantly evolving field, and what is best for it and its users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize user privacy, and to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the user's privacy settings or preferences. It should also be understood that the original applicant intends that the systems and methods described herein, if implemented or used by other entities, be in compliance with privacy policies and practices that are consistent with its objective to respect the user's privacy.

What is claimed is:

1. A computer-implemented method for implementing secure transfers, the method comprising:
   receiving a transaction from a user, the transaction including at least an encrypted amount and an account state commitment;
   storing the account state commitment in a first data structure;
   determining an encrypted balance for a receiver based on the encrypted amount;
   storing, in a second data structure, the encrypted balance mapped to a public key of the user; and
   updating an encrypted outgoing balance of the user and a current encrypted balance of the receiver according to the transaction, wherein the first data structure corresponds to an outgoing Merkle tree tracking a state of an outgoing balance and the second data structure corresponds to an incoming Merkle tree tracking a state of an incoming balance.

2. The computer-implemented method of claim 1, wherein the encrypted amount is encrypted using a public key of the user, and the transaction includes the public key, an address of an account of the user, an address of an account of the receiver, and a zero-knowledge proof indicating ownership of the address and proving knowledge of values included in the account state commitment.

3. The computer-implemented method of claim 1, further comprising generating a hash of the account state commitment, wherein the hash is appended to the first data structure.

4. The computer-implemented method of claim 1, further comprising generating a hash of the encrypted balance, wherein the hash updates a previous hash in a fixed position associated with the user within the second data structure.

5. The computer-implemented method of claim 1, further comprising:
   generating a transaction summary including an address of the user, address of the receiver, and a transaction amount; and
   encrypting the transaction summary using an auditor public key, wherein the encrypted transaction summary is included in the transaction, and an auditor private key corresponding to the auditor public key can decrypt the encrypted transaction summary.

6. The computer-implemented method of claim 1, further comprising, based on the account state commitment including a deposit balance, determining a deposit amount and updating a total encrypted balance of the user in the first data structure.

7. The computer-implemented method of claim 1, wherein the state of the outgoing balance includes operations that result in a decrease in a total balance of an account of the user, and the account state commitment is stored as a leaf in the outgoing Merkle tree.

8. The computer-implemented method of claim 1, wherein the state of the incoming balance includes operations made from an outside account that result in an increase in a total balance of an account of the user.

9. The computer-implemented method of claim 1, further comprising:
   generating a nullifier for the account state commitment using a private key of the user; and
   appending a previous nullifier corresponding to a previous account state commitment to a nullifier list, the nullifier list comprising account state commitments that have been spent by the user.

10. The computer-implemented method of claim 1, further comprising:
    generating, based on a private key of the user and a previous leaf key, a unique leaf key corresponding to the account state commitment; and
    storing the unique leaf key to a mapping including account state commitments and leaf keys, wherein the user can query the mapping to identify a latest account state commitment using the private key.

11. A system for implementing secure transfers, comprising:
    one or more processors; and
    a memory comprising instructions stored thereon, which when executed by the one or more processors, causes the one or more processors to:
      receive a transaction from a user, the transaction including at least an encrypted amount and an account state commitment;

store the account state commitment in a first data structure;

determine an encrypted balance for a receiver based on the encrypted amount;

store, in a second data structure, the encrypted balance mapped to a public key of the user; and update an encrypted outgoing balance of the user and a current encrypted balance of the receiver according to the transaction, wherein the first data structure corresponds to an outgoing Merkle tree tracking a state of an outgoing balance and the second data structure corresponds to an incoming Merkle tree tracking a state of an incoming balance.

12. The system of claim 11, wherein the encrypted amount is encrypted using a public key of the user, and the transaction includes the public key, an address of an account of the user, an address of an account of the receiver, and a zero-knowledge proof indicating ownership of the address and proving knowledge of values included in the account state commitment.

13. The system of claim 11, wherein the instructions, when executed by at least one of the one or more processors, further causes the system to:

generate a first hash of the account state commitment, wherein the first hash is appended to the first data structure; and generate a second hash of the encrypted balance, wherein the second hash updates a previous hash in a fixed position associated with the user within the second data structure.

14. The system of claim 11, wherein the instructions, when executed by at least one of the one or more processors, further causes the system to:

generate a transaction summary including an address of the user, address of the receiver, and a transaction amount; and encrypt the transaction summary using an auditor public key, wherein the encrypted transaction summary is included in the transaction, and an auditor private key corresponding to the auditor public key can decrypt the encrypted transaction summary.

15. The system of claim 11, wherein:

the state of the outgoing balance includes operations that result in a decrease in a total balance of an account of the user, and the account state commitment is stored as a leaf in the outgoing Merkle tree; and the state of the incoming balance includes operations made from an outside account that result in an increase in a total balance of an account of the user.

16. The system of claim 11, wherein the instructions, when executed by at least one of the one or more processors, further causes the system to:

generate a nullifier for the account state commitment using a private key of the user; and append a previous nullifier corresponding to a previous account state commitment to a nullifier list, the nullifier list comprising account state commitments that have been spent by the user.

17. The system of claim 11, wherein the instructions, when executed by at least one of the one or more processors, further causes the system to:

generate, based on a private key of the user and a previous leaf key, a unique leaf key corresponding to the account state commitment; and store the unique leaf key to a mapping including account state commitments and leaf keys, wherein the user can query the mapping to identify a latest account state commitment using the private key.

18. A non-transitory computer-readable medium storing a program for implementing secure transfers, which when executed by a computer, configures the computer to:

receive a transaction from a user, the transaction including at least an encrypted amount and an account state commitment;

store the account state commitment in a first data structure, wherein the first data structure corresponds to an outgoing Merkle tree tracking a state of an outgoing balance and the account state commitment is stored as a leaf in the outgoing Merkle tree;

determine an encrypted balance for a receiver based on the encrypted amount;

store, in a second data structure, the encrypted balance mapped to a public key of the user, wherein the second data structure corresponds to an incoming Merkle tree tracking a state of an incoming balance and a hash of the encrypted balance is stored as a leaf in the incoming Merkle tree; and update an encrypted outgoing balance of the user and a current encrypted balance of the receiver according to the transaction, wherein the first data structure corresponds to an outgoing Merkle tree tracking a state of an outgoing balance and the second data structure corresponds to an incoming Merkle tree tracking a state of an incoming balance.

* * * * *